(12) United States Patent
Liu et al.

(10) Patent No.: US 12,142,794 B2
(45) Date of Patent: Nov. 12, 2024

(54) BATTERY PACK POWER CONNECTOR

(71) Applicant: Inventus Power, Inc., Woodridge, IL (US)

(72) Inventors: Jianfei Liu, Guangdong Province (CN); QiCai Dong, Guangzhou (CN); Shengya Chen, Hunan Province (CN); William Tenorio, Glenview, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 18/141,592

(22) Filed: May 1, 2023

(65) Prior Publication Data

US 2024/0170807 A1     May 23, 2024

Related U.S. Application Data

(63) Continuation-in-part of application No. 17/991,512, filed on Nov. 21, 2022, now Pat. No. 11,817,723.

(51) Int. Cl.
*H01M 50/519* (2021.01)
*H01M 50/213* (2021.01)
*H01M 50/271* (2021.01)
*H01M 50/284* (2021.01)
(Continued)

(52) U.S. Cl.
CPC ....... *H01M 50/519* (2021.01); *H01M 50/213* (2021.01); *H01M 50/271* (2021.01); *H01M 50/284* (2021.01); *H01M 50/296* (2021.01); *H01M 50/516* (2021.01)

(58) Field of Classification Search
CPC ................ H01M 50/296; H01M 50/519
See application file for complete search history.

(56) References Cited

U.S. PATENT DOCUMENTS

| | | | |
|---|---|---|---|
| 10,752,121 B2 * | 8/2020 | Yu | H01M 50/271 |
| 11,095,140 B1 | 8/2021 | Chen et al. | |
| 11,476,677 B2 | 10/2022 | Liu et al. | |

(Continued)

FOREIGN PATENT DOCUMENTS

| | | |
|---|---|---|
| CN | 104157821 A | 11/2014 |
| CN | 105140444 A | 12/2015 |

(Continued)

OTHER PUBLICATIONS

Aug. 29, 2022—(WO) International Search Report and Written Opinion—App PCT/CN2021/137397.

(Continued)

*Primary Examiner* — Gregg Cantelmo
(74) *Attorney, Agent, or Firm* — Banner & Witcoff, Ltd.

(57) ABSTRACT

A medium- and/or large-format (M/L), rechargeable battery pack used for powering attached equipment may include features to protect the battery pack from external fire. For example, the features may protect the battery pack due to exposure to fire from outside of the end device, e.g., a vehicle, due to a fuel spill. According to another aspect of the embodiments, the M/L rechargeable battery pack may include a high current terminal/power connector for the battery pack. The embodiment optimizes the battery pack output power connector assembly, improves and solves poor connection designs that can cause fire hazards from sparks, and provides water ingress protection.

20 Claims, 27 Drawing Sheets

(51) Int. Cl.
H01M 50/296 (2021.01)
H01M 50/516 (2021.01)

(56) References Cited

U.S. PATENT DOCUMENTS

| | | | |
|---|---|---|---|
| 11,699,908 | B2 | 7/2023 | Chen et al. |
| 2017/0244139 | A1* | 8/2017 | Tononishi ............ H01M 10/482 |
| 2018/0076438 | A1* | 3/2018 | DeKeuster .......... H01M 50/553 |
| 2018/0123357 | A1 | 5/2018 | Beaston et al. |
| 2018/0309107 | A1 | 10/2018 | Widener |
| 2020/0152926 | A1 | 5/2020 | Wynn et al. |
| 2021/0167444 | A1 | 6/2021 | Gaigg et al. |
| 2021/0328279 | A1 | 10/2021 | Jeong et al. |

FOREIGN PATENT DOCUMENTS

| | | |
|---|---|---|
| CN | 205231129 U | 5/2016 |
| CN | 206401375 U | 8/2017 |
| CN | 113224427 A | 8/2021 |
| DE | 102009028920 A1 | 3/2011 |
| JP | 2011204395 A | 10/2011 |
| JP | 6365884 B2 | 8/2018 |
| JP | 6902986 B2 | 7/2021 |
| KR | 20210049016 A | 5/2021 |
| KR | 20210049018 A | 5/2021 |
| WO | 2007041828 A1 | 4/2007 |
| WO | 2012061262 A1 | 5/2012 |
| WO | 2020/129596 A1 | 6/2020 |
| WO | 2021/019970 A1 | 2/2021 |
| WO | 2021/140167 A1 | 7/2021 |

OTHER PUBLICATIONS

Feb. 9, 2024—(EP) European Search Report—App EP20938646.5.
EG&G Technical Services, Inc., "Fuel Cell Handbook," Seventh Edition, U.S. Department of Energy, etc., Morgantown, West Virginia, Nov. 2004.
Jet Propulsion Laboratory, "Energy Storage Technology for Future Space Science Missions," Pasadena, California, Nov. 2004.
Science Direct, "Investigation of the Porous Structure of Battery Separators using Various Porometric Methods," Journal of Power Sources, vol. 158, Issue 2, Aug. 25, 2006, pp. 1054-1061.

* cited by examiner

BATTERY PACK POWER CONNECTOR

CROSS-REFERENCE TO RELATED APPLICATIONS

This application is continuation of International Patent Application Serial No. PCT/CN2021/137397 with an international filing date of Dec. 13, 2021. This application is also a continuation-in-part application of U.S. patent application Ser. No. 17/991,512, with a filing date of Nov. 21, 2022, issued Nov. 14, 2023, as U.S. Pat. No. 11,817,723. All of the aforementioned are expressly incorporated herein by reference in their entireties.

TECHNICAL FIELD

Aspects described herein generally relate to medium- or large-format (M/L), rechargeable batteries. More specifically, aspects of this disclosure relate to M/L format battery pack and battery systems with a plurality of battery packs/cells inside.

BACKGROUND

Battery technology has evolved from the nascent era of automation when vehicle batteries were typically large and heavy affairs using lead-acid technology. Battery technology has evolved to provide more electrical energy with less space. For example, Lithium-ion (Li-ion) batteries are quickly replacing regular zinc carbon and lead batteries because they are smaller and lighter than traditional batteries and can hold charge for up to three times longer than big, heavy traditional batteries. Consequently, Li-ion batteries are finding applications for powering tools, appliances, and vehicles including forklifts, cars, trucks, and so forth. Moreover, battery technology is not stagnant. For example, new solid-state batteries use a glass electrolyte and lithium or sodium metal electrodes, providing approximately three times as much energy density as Li-ion batteries. In general, however, new technology batteries have a potential to overheat, catch on fire, and cause a fire hazard.

SUMMARY

A battery pack system may comprise a plurality of battery blocks. Each battery pack may support battery cells (often Li-ion).

In an aspect, a battery pack output connection assembly may comprise a printed circuit board assembly (PCBA) that includes at least one polygon-shaped opening, at least one metal terminal, and an enclosure cover configured to fit over an outer enclosure of the battery pack. The battery pack output connection assembly may be for use with a battery pack that comprises a plurality of battery cells. Each metal terminal may fit inside each of the polygon-shaped openings of the PCBA. The metal terminal may include a terminal head, a terminal base with a polygon shape and adjacent the PCBA, and a metal rod soldering head opposite the terminal head. The metal rod soldering head may be polygon-shaped to match and fit inside the polygon-shaped opening of the PCBA. The metal rod soldering head may include one or more grooves along the metal rod soldering head to increase the welding force, torque force, and high impact force. The one or more grooves may include two grooves that create a cross along the metal rod soldering head. The enclosure cover may include at least one cover hole. Each cover hole slides over and tightly fits around each metal terminal.

With another aspect, a battery pack output connection assembly may comprise a printed circuit board assembly (PCBA) that includes at least one polygon-shaped opening, at least one metal plate mounted on the PCBA using a surface mount technology (SMT), at least one metal terminal, and an enclosure cover configured to fit over an outer enclosure of the battery pack. The battery pack output connection assembly may be for use with a battery pack that comprises a plurality of battery cells. Each metal plate may include an arm portion and a hole portion. The hole portion may be located over the polygon-shaped opening of the PCBA. The arm portion may extend along the PCBA to increase a conductive cross-sectional area along the PCBA to withstand a high current. The hole portion may be polygon-shaped to match the polygon-shaped opening of the PCBA. Each metal terminal may fit inside each of the polygon-shaped openings of the PCBA and the hole portions of the metal plate. The metal terminal may include a terminal head, a terminal base with a polygon shape and adjacent the metal plate and the PCBA, and a metal rod soldering head opposite the terminal head. The metal rod soldering head may be polygon-shaped to match and fit inside the polygon-shaped opening of the PCBA. The enclosure cover may include at least one cover hole. Each cover hole may slide over and tightly fits around each metal terminal.

With yet another aspect, a battery pack output connection assembly may comprise a printed circuit board assembly (PCBA) that includes at least one polygon-shaped opening, at least one metal plate mounted on the PCBA using a surface mount technology (SMT), at least one metal terminal, and an enclosure cover configured to fit over an outer enclosure of the battery pack. The battery pack output connection assembly may be for use with a battery pack that comprises a plurality of battery cells. Each metal plate may include an arm portion and a hole portion, with the hole portion located over the polygon-shaped opening of the PCBA. Each metal terminal may fit inside each of the polygon-shaped openings of the PCBA. The metal terminal may include a terminal head, a terminal base with a polygon shape and adjacent the metal plate and the PCBA, and a metal rod soldering head opposite the terminal head. The metal rod soldering head may be polygon-shaped to match and fit inside the polygon-shaped opening of the PCBA. The enclosure cover may include at least one cover hole. Each cover hole may slide over and tightly fit around each metal terminal. Each cover hole may include a top portion, middle portion, and a bottom portion. The top portion may include a gradient circular opening to fit over and match the conoid shape of the terminal head of the metal terminal. The middle portion may include a straight-edge circular opening to fit over and match the metal terminal. The bottom portion may include a polygon-shaped opening to fit over and match the polygon-shape of the terminal base of the metal terminal.

In another aspect, a battery pack may include an outer enclosure that houses a plurality of battery cell holders, an enclosure cover that fits over the outer enclosure, a plurality of battery cells fixed within the plurality of battery cell holders, a first plate located adjacent to a bottom of a battery block, and a second plate located adjacent to a top of the battery block opposite the first plate. The battery pack may be for use with a battery system configured for electrically powering an end device and comprising a plurality of battery packs. The outer enclosure may comprise four outer walls extending perpendicularly from a base. The outer enclosure may include a filling material of both a resin and a glass fiber. The plurality of battery cells may be arranged in the battery cell holder in a parallel configuration with their end faces arranged in the same plane to form the battery block. Each of the plurality of battery cells may include an outer tube extending around a body of each of the plurality of battery cells. The outer tube may provide thermal insulation to each of the plurality of battery cells. The first plate and/or the second plate may include mica material to provide thermal insulation to the plurality of battery cells and the battery block.

In another aspect, a battery pack may include an outer enclosure that houses a plurality of battery cell holders, an enclosure cover that fits over the outer enclosure, a plurality of battery cells fixed within the plurality of battery cell holders forming a battery block, a first plate located adjacent to a negative side of the battery block, and a second plate located adjacent to a positive side of the battery block. The battery pack may be used with a battery system configured for electrically powering an end device and comprising a plurality of battery packs. Further, the outer enclosure may comprise four outer walls extending perpendicularly from a base. The outer enclosure may include a filling material of both a resin and a glass fiber. The filling material may fill a layer within the outer enclosure. The enclosure cover may include an output power connect assembly with a printed circuit board assembly (PCBA) and one or more metal terminal components. Each of the plurality of battery cells may include an outer tube extending around a body of each of the plurality of battery cells. The outer tube may be a mica tube to provide thermal insulation to the plurality of battery cells and the battery block. The first plate and/or the second plate may include mica material to provide thermal insulation to the plurality of battery cells and the battery block.

In yet another aspect, a battery pack may include an outer enclosure that houses a plurality of battery cell holders, an enclosure cover that fits over the outer enclosure, a plurality of battery cells fixed within the plurality of battery cell holders and forming a battery block, a first plate located adjacent to a bottom of the battery block, and a second plate located adjacent to a top of the battery block opposite the first plate. The battery pack may be for use with a battery system configured for electrically powering an end device and comprising a plurality of battery packs. The outer enclosure may comprise four outer walls extending perpendicularly from a base. Further, the outer enclosure may include a filling material of both a resin and a glass fiber. The filling material may fill a layer within the four outer walls and the base of the outer enclosure. The outer walls may comprise a plurality of concave and convex ribs. The plurality of concave and convex ribs may extend vertically from the base along an external surface of the plurality of outer walls. The plurality of battery cells may be arranged in the battery cell holder in a parallel configuration with their end faces arranged in the same plane to form the battery block. Each of the plurality of battery cells may include an outer tube extending around a body of each of the plurality of battery cells. The outer tube may be a mica tube to provide thermal insulation to each of the plurality of battery cells. The first plate and/or the second plate may be a first mica plate to provide thermal insulation to the plurality of battery cells and the battery block.

In another aspect, a large-format battery pack may be configured for electrically powering an end device. The large-format battery pack may comprise: an outer enclosure comprising a battery cell holder configured to hold a plurality of battery cell modules; a plurality of battery cells; at least one thermistor temperature sensor positioned to measure an external temperature of a battery cell of the plurality of battery cells; and a temperature sensor holder to hold the thermistor temperature sensor against a longitudinal side of the battery cell. The thermistor temperature sensor may be a one of a negative temperature coefficient (NTC) thermistor temperature sensor or a positive temperature coefficient (PTC) thermistor temperature sensor. The battery cell holder may include a top cover and a bottom holder. Each battery cell of the plurality of battery cells may be fixed within a battery cell module of the plurality of battery cell modules. The plurality of battery cells may be arranged in the battery cell holder in a parallel configuration to form a battery block. The temperature sensor holder may comprise a first end, a second end opposite the first end, and a rod extending between the first end and the second end. The first end may comprise a tab. The second end may comprise a clip portion. The rod may comprise an angular bend configured to provide a biasing force to the second end and in the direction of a longitudinal side of the battery cell. The tab may affix the temperature sensor holder to the top cover adjacent a terminal of the battery cell. The clip portion of the temperature sensor holder may attach to the thermistor temperature sensor. The rod may be positioned adjacent to the longitudinal side of the battery cell.

With another aspect, a method for attaching thermistor temperature sensor to a large-format battery pack configured for electrically powering an end device, the method may comprise: attaching a thermistor temperature sensor to a temperature sensor holder; inserting the second end of the temperature sensor holder into a battery cell module; securing the first end of the temperature sensor holder to the top cover and adjacent to the battery cell; and positioning the thermistor temperature sensor against a longitudinal side of the battery cell. The temperature sensor holder may comprise a first end with a tab and a second end opposite the first end. The second end may comprise a clip portion attaching to the thermistor temperature sensor. The temperature sensor holder may comprise a bar rod extending between the first end and the second end. The thermistor temperature sensor may be configured to measure an external temperature of a battery cell. The battery cell module may include a top cover and a bottom holder. The second end of the temperature sensor holder may be inserted through an access hole in the top cover. The tab may be located on the top cover adjacent a terminal of the battery cell. The battery cell may be fixed within the battery cell module. The battery cell may be one of a plurality of battery cells arranged in the battery cell holder in a parallel configuration to form a battery block. The bar rod may include an angular bend. When the tab is secured to the top cover, the angular bend may provide a biasing force that pushes the clip portion and the thermistor temperature sensor against the longitudinal side of the battery cell to measure the external temperature of the battery cell. The thermistor temperature sensor may be a one of a negative temperature coefficient (NTC) thermistor temperature sensor or a positive temperature coefficient (PTC) thermistor temperature sensor.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

DETAILED DESCRIPTION

According to an aspect of the embodiments, a large-format, rechargeable battery (e.g., a Li-ion battery) used for powering attached equipment (an end device) may include features to prevent the battery pack from external fire. For example, the features may solve the battery pack withstanding an external fire and/or against exposure to fire from outside of the end device, such as a vehicle, due to a fuel spill from the vehicle (either the vehicle itself or a nearby vehicle). The battery pack will not explode and endanger people near and/or passengers around the vehicle. The battery pack may provide the driver and the passengers in and around the vehicle with enough time (approximately 130 seconds) to evacuate, which complies with the standard of fire resistance tests and standards known and used in the industry.

According to an aspect of the embodiments, the battery pack may utilize a cell protection method that includes two parts. First, a plastic enclosure case of the battery pack may include a mixed material of resin and glass fiber to prevent the core of the battery pack from catching fire inside. The structural design of the enclosure case may pass the fire resistance test of fire resistance standards and tests known and used in the industry. Second, the battery pack may include mica tubes and mica plates to cover the cell holder, thereby protecting the battery cells. The mica tubes and the mica plates may reduce the thermal heat from any external fire from reaching the battery cells to significantly reduce the chance of the battery cells catching on fire.

According to another aspect of the embodiments, a battery pack may support different advanced technology batteries of different chemistries and/or structures including, but not limited to, Li-ion batteries and solid-state batteries.

Figure 1:
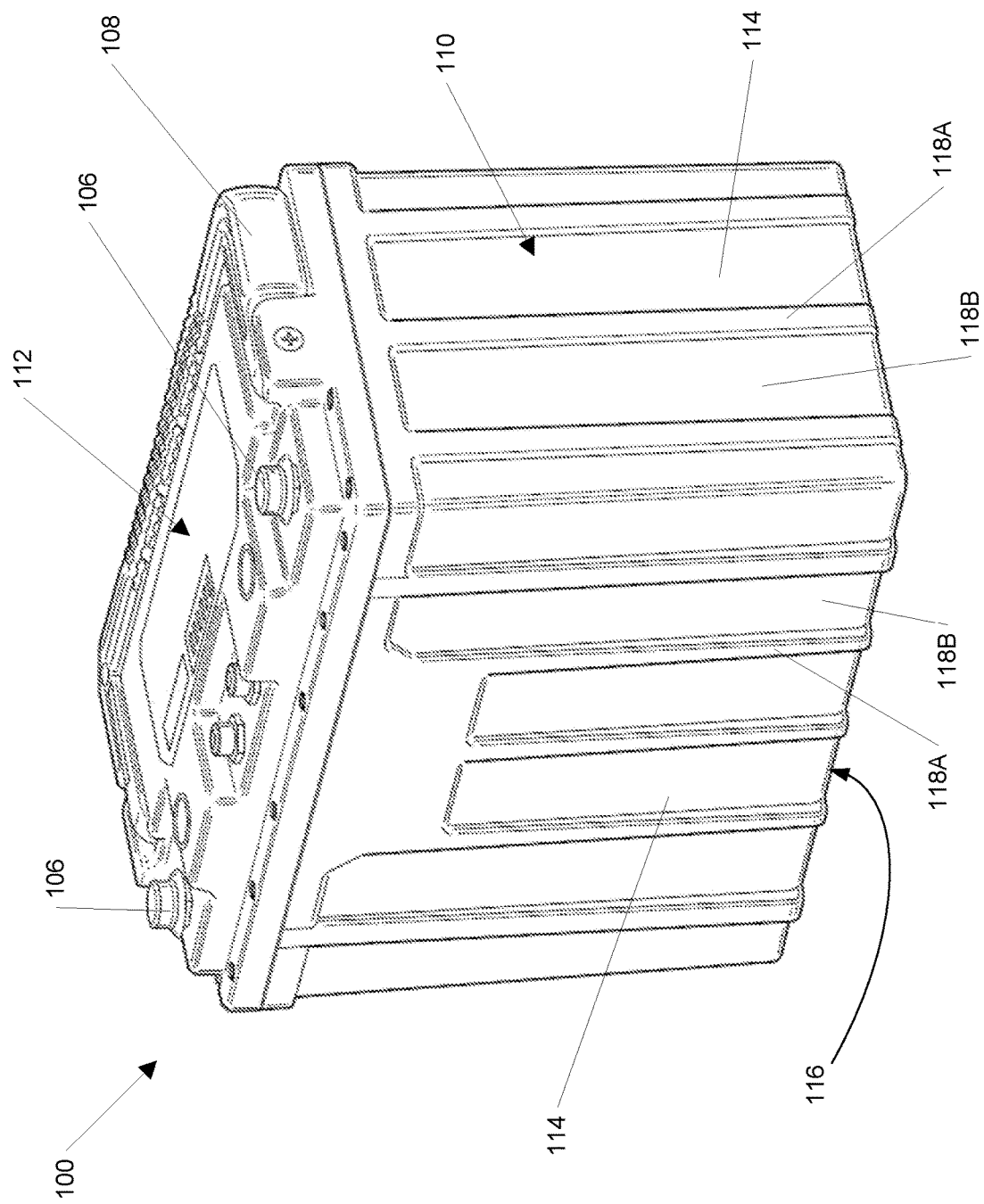
FIG. 1 shows a perspective view of a battery pack in accordance with an embodiment.

FIG. 1 shows an exemplary battery pack 100. The battery pack 100 may be a rechargeable battery pack. The rechargeable battery pack 100 may be utilized to power or provide power to an end device, such as a vehicle. The end device may assume different types of devices including, but not limited to, power tools, lawn mowers, garden tools, appliances, and vehicles including forklifts, cars, trucks, and so forth. The rechargeable battery pack 100 may be housed within the end device, mounted to the end device, or externally situated with respect to end device. The battery pack 100 may be utilized with other battery packs 100. The battery pack 100 may include an outer enclosure case 110 and an enclosure cover 112 that fits on top of the enclosure case 110. The outer enclosure case 110 may house one or more battery cell holders 120. The battery pack 100 may also include a plurality of battery cells 130 fixed within the plurality of battery cell holders 120.

As illustrated in FIG. 1, the battery pack 100 may include an output power connect assembly. The output power connect assembly may include a printed circuit board assembly (PCBA) and/or a metal terminal component or terminals 106. The terminals 106 may be utilized to power the end device. The battery pack 100 may also include a handle 108 located on the enclosure cover 112.

The battery pack 100 may include an outer enclosure case 110 that holds and houses the plurality of battery cell holders 120. The outer enclosure case 110 may be defined by an outer enclosure that comprises four outer walls 114 extending perpendicularly from an enclosure base 116. One or more of the four outer walls 114 may include a plurality of convex ribs 118A and/or a plurality of concave ribs 118B. The convex ribs 118A and/or concave ribs 118B may extend vertically from the enclosure base 116 along the external surface of the outer walls 114. The convex ribs 118A and/or concave ribs 118B may provide an optimized structural design to help with the battery pack 100 withstanding external fire and against exposure to fire from outside and not exploding. The outer enclosure case 110 may be a plastic material. Other materials may be utilized for the outer enclosure case 110.

Figure 5:
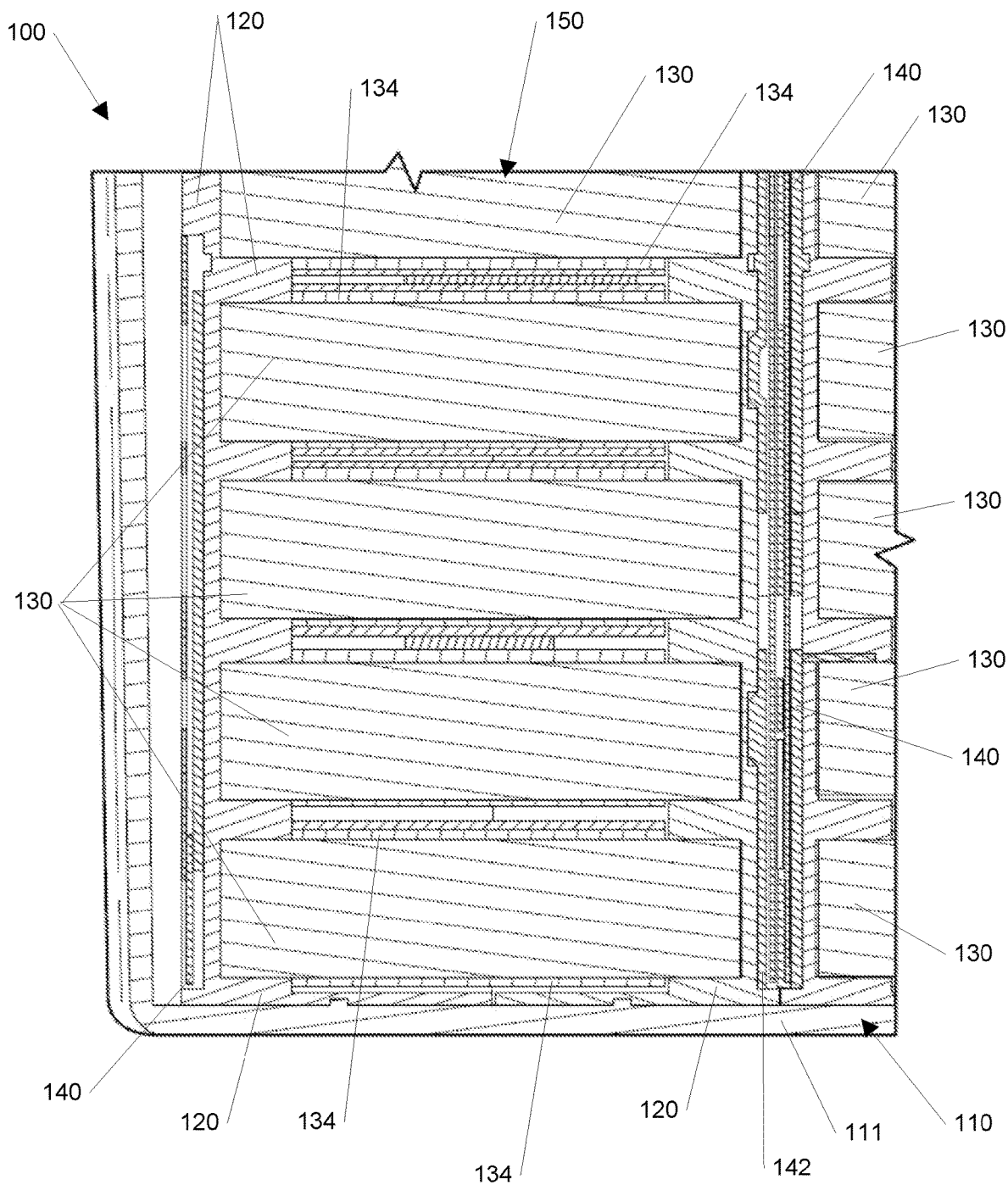
FIG. 5 shows a sectional view of the battery pack from FIG. 1 in accordance with an embodiment.

Additionally, as illustrated in the cross-sectional view of the battery pack 100 in FIG. 5, the outer enclosure case 110 may include a filling material 111. The filling material 111 may help prevent the core battery pack 100 from catching fire inside. The filling material 111 may include a mixed material of resin and glass fiber. Various combinations of resin and glass fiber (fiberglass) may be utilized for the filling material 111. For example, the filling material may be approximately 65% resin and approximately 35% glass fiber. In another example, the filling material 111 may include a ratio of resin to glass fiber of approximately 2.5:1, i.e. 1 kg of fiberglass requires approx. 2.5 kgs of resin. Other ratios and mixtures of resin and glass fiber may be utilized for the filling material 111. Additionally, other materials may be utilized for the filling material 111 that will help prevent the battery pack 100 from catching fire inside. The filling material 111 may fill a layer within the outer enclosure case 110. The filling material 111 may also fill a layer within the four outer walls 114 and/or the enclosure base 116 of the outer enclosure case 110.

Additionally, the optimized structural design and the enclosure filling material 111 may be beneficial to pass fire resistance tests and standards known and used in the industry. One example fire resistance test may be ECE R100. For example, ECE R100 may comprise a fire resistance test procedure to verify the resistance of the battery, against exposure to fire from outside of the battery and an end item or vehicle due to e.g. a fuel spill from. This situation should leave the users (and/or driver and passengers) with enough time to evacuate. The fire resistance test may include direct exposure which may include exposing the battery to a flame from a freely burning fuel for 70 seconds. The fire resistance test may also include indirect exposure which may include placing a screen between the flame and the battery and exposing the battery to the reduced flame for a further 60 seconds.

Figure 2:
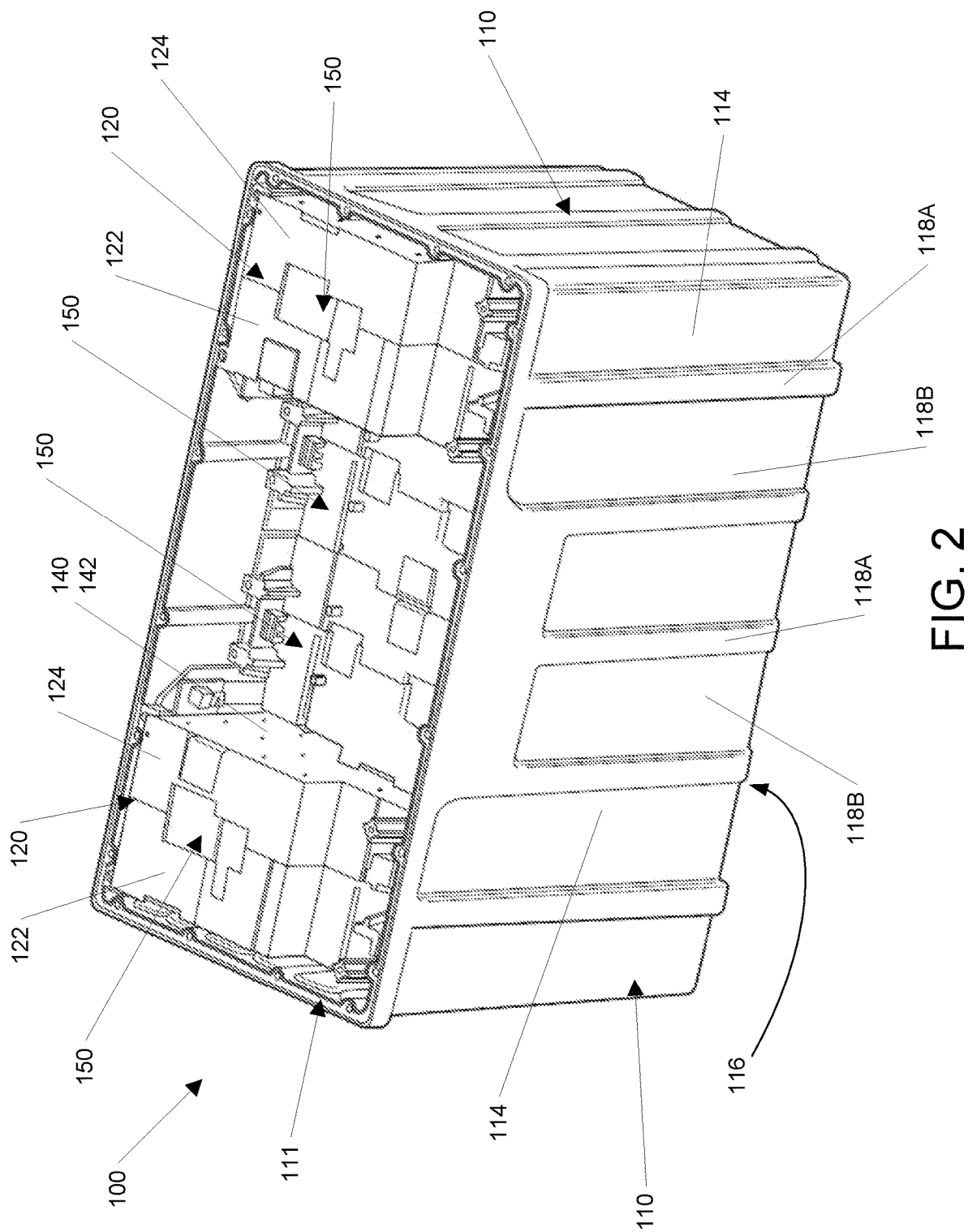
FIG. 2 shows a top perspective view of the battery pack from FIG. 1 with the top enclosure cover removed in accordance with an embodiment.
Figure 3:
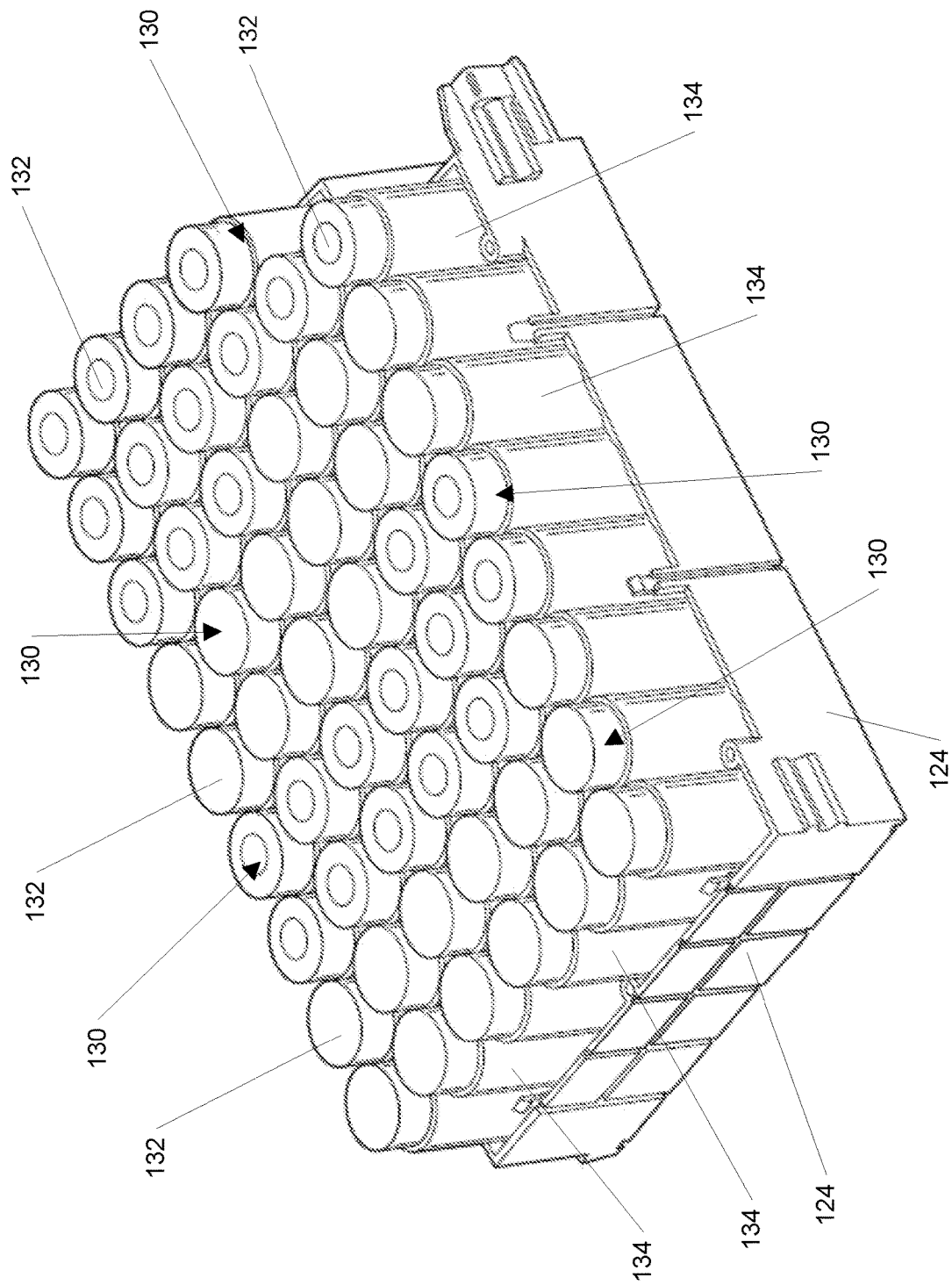
FIG. 3 shows a perspective view of a battery cell holder and battery cells from the battery pack from FIG. 1 in accordance with an embodiment.
Figure 4:
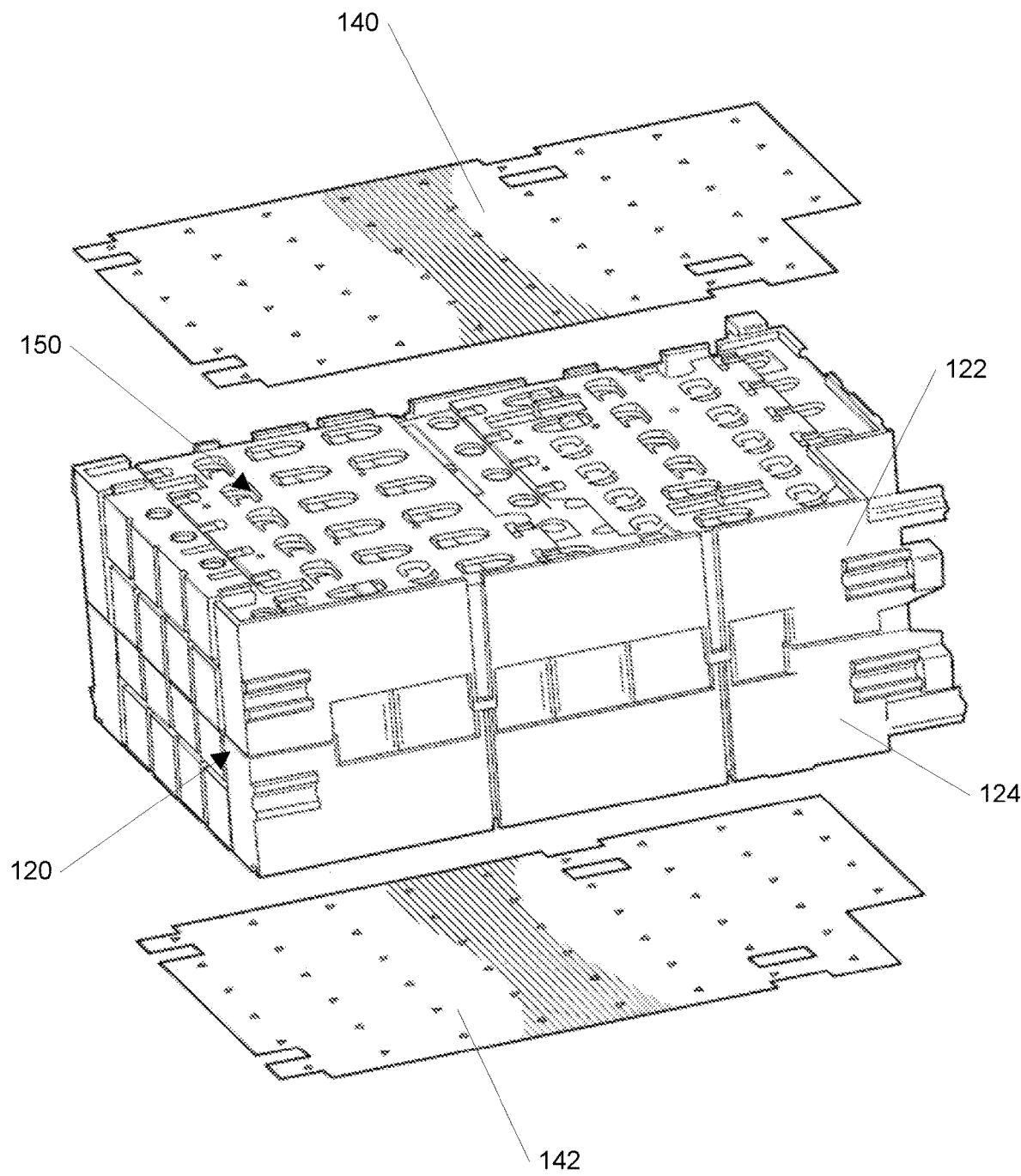
FIG. 4 shows an exploded perspective view of the internal components of the battery pack from FIG. 1 in accordance with an embodiment.

Referring to FIGS. 2-4, the battery pack 100 may include one or more battery cell holders 120 that hold individual battery cells 130. FIG. 2 shows the battery pack 100 without the enclosure cover 112. As illustrated in FIG. 2, each of the battery cell holders 120 with the battery cells 130 may make up various battery blocks 150. The battery pack 100 may include various battery blocks 150 that fit within the outer enclosure case 110 of the battery pack 100. The outer enclosure case 110 may include a plurality of battery blocks 150 electrically connected to provide power for the battery pack 100. As further illustrated in FIG. 2, the battery cell holders 120 may include both a top cover 122 and a bottom holder 124 that fit together to hold the battery cells 130 for the battery block 150.

FIG. 3 illustrates a battery cell holder 120 with the bottom holder 124 holding the battery cells 130. The battery cell 130 may be a cylindrical battery or other shapes that may be known and used in the art. The battery cells 130 may be arranged in the battery cell holder 120 in a parallel configuration with their ends faces 132 arranged in the same plane to form individualized battery blocks 150 within the battery cell holder 120. The battery cells 130 may be a lithium ion battery (Li-ion). The battery cells 130 may be other forms of batteries.

Further, referring to FIG. 3, the battery cells 130 may include an outer tube 134 extending around the body of each of the battery cells 130. The outer tube 134 may provide thermal insulation to each of the battery cells 130 to help prevent fire within the battery block 150 and the battery pack 100. The outer tube 134 may also be an outer mica tube to provide thermal insulation to the battery cells 130 to help prevent fire within the battery block 150 and the battery pack 100. The outer tube 134 may include other materials that provide thermal insulation and help prevent fire, such as an aerogel. The outer tube 134 (or mica tube) may wrap around the battery cell 130 for the majority of the length. The exposed surface on the battery cell 130 toward the top and the bottom of the battery cell 130 may allow the battery cell 130 to be located within the battery cell holder 120 and battery block 150. Further, the outer tube 134 (or mica tube) covers the battery cell 130 and isolates the heat from the outside of the battery cell 130. The outer tube 134 (or mica tube) may be fixed in the middle of the top cover 122 and the bottom cover 124, with no gap between the outer tube 134 (or mica tube) and the battery cell 130.

FIG. 4 illustrates a battery block 150 and the battery cell holder 120 with both the top cover 122 and the bottom holder 124. As illustrated in FIG. 4, the battery block 150 may also include one or more plates 140, 142. Specifically, a first plate or bottom plate 140 may be located at and/or adjacent to a bottom side of the battery block 150. The bottom plate 140 may also be located at and/or adjacent to the negative side of the battery block 150. Additionally, a second plate or top plate 142 may be located at and/or adjacent to a top side of the battery block 150. The top plate 142 may also be located at and/or adjacent to the positive side of the battery block 150. The first plate 140 and the second plate 142 may include a mica material to provide thermal insulation to the plurality of battery cells 130 and the battery block 150. Additionally, the first plate 140 and the second plate 142 may be a mica plate to provide thermal insulation to the plurality of battery cells 130 and the battery block 150. The first plate 140 and the second plate 142 may include other materials that provide thermal insulation and help prevent fire.

The first plate 140 and the second plate 142 may be an aluminum plate that includes a mica sheet. In some embodiments, the first plate 140 and the second plate 142 may include an aluminum plate separate from a mica sheet. The mica sheet may be secured and maintained as close as possible to the aluminum plates using a glue fixing on the outer surface of the aluminum plate. The mica sheets may be used to prevent thermal propagation out of the battery block 150 and the battery cell holder 120 which could then spread to other modules, the enclosure, or other components, such as the PCBA. The mica sheets and/or first plate 140 and second plate 142 may be used in the positive pole and the negative pole of the battery cell 130, which prevents the heat from outside a cell pole. The first plate 140 and the second plate 142 may be include an approximate 4 mm gap between the first plate 140/second plate 142 and the battery cells 130.

In other embodiments, the battery cells 130 may include a plurality of battery cells that are connected in series to obtain a desired voltage level. For example, with Li-ion technology, each battery cell may have a nominal voltage of approximately 3.6 volts. With four battery cells connected in series, the total nominal voltage provided by battery pack 100 is approximately 14.4 volts.

FIG. 5 illustrates a cross-sectional view of the battery pack 100. As illustrated in FIG. 5, the battery pack 100 includes the outer enclosure case 110 filled with the filling material 111 of a mixed material of resin and glass fiber to help prevent the core battery pack 100 from catching fire inside. Further, the battery pack 100 includes one or more battery blocks 150 with a battery cell holder 120 holding various battery cells 130 arranged in a parallel configuration next to each other. The battery block 150 may include a first/bottom plate 140 and a second/top plate 142 that include a mica material to provide thermal insulation to the plurality of battery cells 130 and the battery block 150. The battery cells 130 may include an outer mica tube 134 to provide thermal insulation to the battery cells 130 to help prevent fire within the battery block 150 and the battery pack 100.

According to another aspect of the embodiments, as detailed below and illustrated in FIGS. 6-12, a medium or large-format (M/L), rechargeable battery (e.g., a Li-ion battery) used for powering attached equipment (an end device) may include features to provide a technology for a high current terminal/power connector for a M/L battery pack. The embodiment optimizes the battery pack output power connector assembly, improves and solves poor connection designs that can cause fire hazards from sparks, and provides water ingress protection. The high current power connector may include a metal terminal soldering on the PCBA. The high current power connector may also include an exposed metal rod top surface out of the cover. The high current power connector may also include several grooves at the metal rod soldering head to increase the welding force to withstand the high torque force required, high impact force required, and reliability required. The high current power connector may also include one or more O-rings around the terminal that match with the outer cover and may include lubricating oil in the gap for water ingress protection and compliance for with water ingress and waterproof tests and standards known and used in the industry, such as IPX7. The high current power connector may also include a conductive cross-sectional area to meet the high current requirements. The high current power connector may also include a conoid/conical shaped head for guiding and optimizing the matching features. The high current power connector may also include a polygon structure terminal head soldering with the PCBA to help solve the high torque force requirements. The high current power connector may also include a polygon structure at the terminal and match with the outer cover to improve the torque force the terminal can withstand.

According to an aspect of the embodiments, the battery pack and the high current power connector may utilize a terminal design concept that includes four parts. First, a polygon shape may match with the PCBA and metal terminal to strengthen the soldering performance and improve the torsion resistance. Second, two grooves may be utilized on the metal rod soldering head to increase the soldering area and help the soldering terminal and pin pass through the terminal and strengthen the torsion resistance. Third, a polygon shape structure may match with the cover to provide and improve torsion resistance. Fourth, one or more O-rings may be utilized between the terminal and the cover for water ingress protection and compliance with water ingress and waterproof tests and standards known and used in the industry, such as IPX7.

Figure 6:
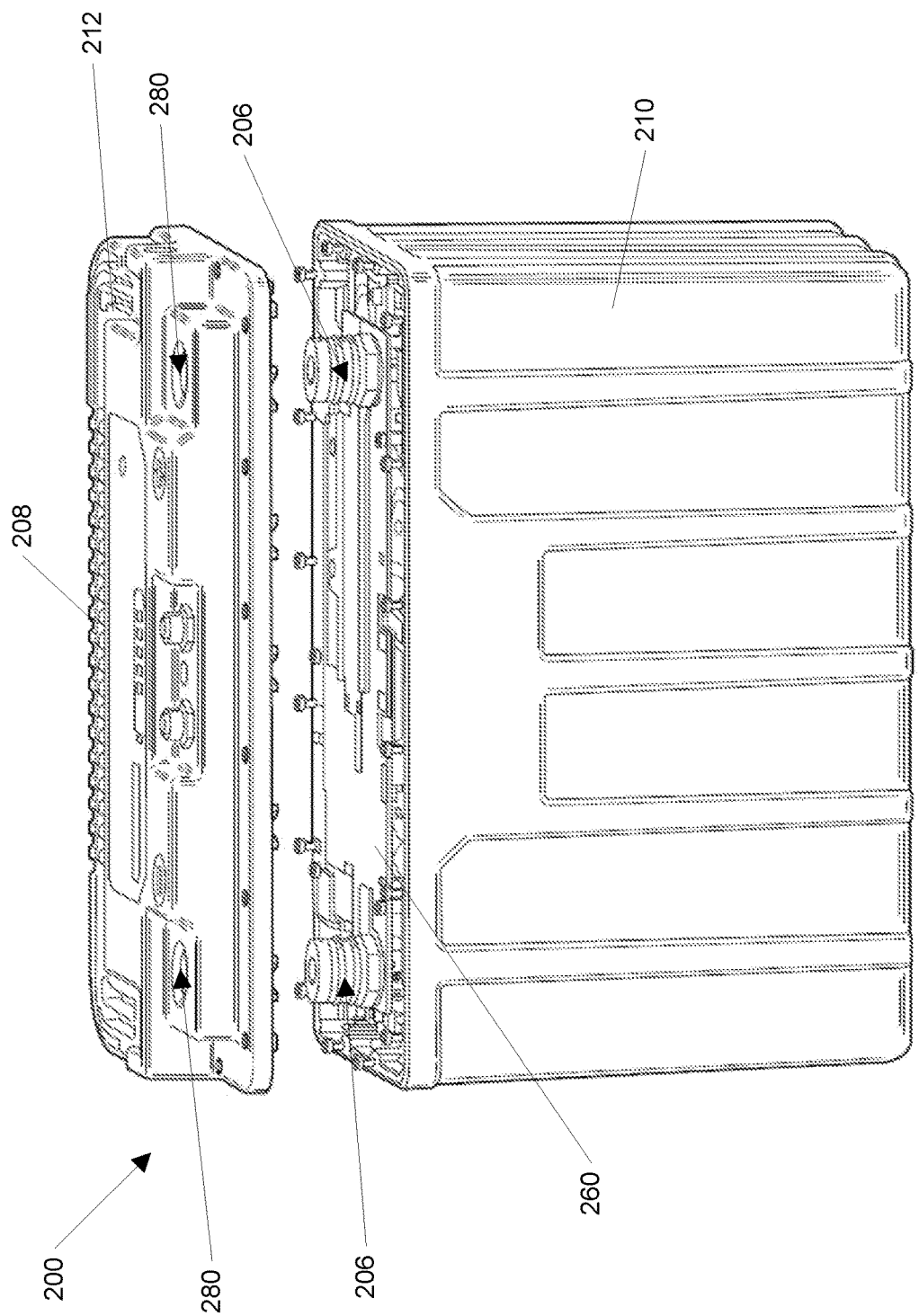
FIG. 6 shows an exploded component view of another battery pack in accordance with an embodiment.

FIG. 6 illustrates an exploded component view of a second embodiment of a battery pack 200. For the embodiment of FIGS. 6-12, the features of the battery pack 200 are referred to using similar reference numbers under the "2XX" series of reference numerals, rather than "1XX" as used for the battery pack 100 in the embodiments of FIGS. 1-5. A "1XX" feature may be similar to "2XX" feature. Accordingly, certain features of the battery pack 200 that were already described above with respect to the battery pack 100 of FIGS. 1-5 may be described in lesser detail, or may not be described at all. Further, any combination of the features of the battery pack 100 may be utilized with the battery pack 200. Vice versa, any combination of the features of the battery pack 200 may be utilized with the battery pack 100.

The battery pack 200 illustrated in FIGS. 6-12 includes a terminal/power connector with improved features. The battery pack 200 may include a printed circuit board assembly (PCBA) 260, a metal plate 262 mounted on the PCBA 260, at least one metal terminal component 206 extending through the PCBA 260 and the metal plate 262, and an enclosure cover 212 that fits on an outer enclosure 210 of the battery pack 200. The enclosure cover 212 may cover the PCBA 260, the metal plate 262, and the metal terminal components 206.

As illustrated in FIGS. 7A, 8, 9, and 10, at least one metal plate 262 may be mounted on the PCBA 260. The PCBA 260 may include a polygon-shaped opening 268. Each metal plate 262 may include an arm portion 264 and a hole portion 266. The hole portion 266 may include a polygon-shaped hole 267 and an arm portion 264 that extends from the hole portion 266. The polygon-shaped hole 267 may be located over the polygon-shaped opening 268 of the PCBA 260. The polygon-shaped hole 267 may match with size and shape the polygon-shaped opening 268 of the PCBA 260. The polygon-shaped hole 267 and/or the polygon-shaped opening 268 may be a hexagonal shape. Other polygon-shapes may be utilized for the polygon-shaped hole 267 and/or the polygon-shaped opening 268, as long as the shape for the polygon-shaped hole 267 and/or the polygon-shaped opening 268 are matched, such as square, rectangle, pentagon, octagon, star, etc. The arm portion 264 may extend away from the hole portion 266 and along the PCBA 260 to increase a conductive cross-sectional area along the PCBA 260 to help withstand a high current.

Each metal plate 262 may be mounted on the PCBA 260 using a surface mount technology (SMT). SMT (Surface Mount Technology) is known as a packaging technology in electronics that mounts electronic components on the surface of a Printed Circuit Board/Printed Wiring Board (PCB/PWB) or PCBA instead of inserting them through holes of the board. SMT may provide state-of-art, miniature electronics products at reduced weight, volume and cost.

As illustrated in FIGS. 6, 7A, 7B, 7C, 8, 10, and 11, the battery pack 200 may include at least one metal terminal component 206. Generally, the battery pack 200 will include two metal terminal component 206 located on opposite sides of the battery pack 200. Other numbers of metal terminal components 206 may be utilized for the battery pack 200. Each of the metal terminal components 206 may include red copper to help withstand a high current for the battery pack 200.

Each metal terminal component 206 may fit inside each of the polygon-shaped opening 268 of the PCBA 260 and the polygon-shaped hole 267 of the metal plate 262. The metal terminal component 206 may include a terminal base 270, a terminal head 272, and a metal rod soldering head 274 opposite the terminal head. The terminal base 270 may be located adjacent the metal plate 262. The terminal base 270 may include a polygon shape. The polygon shape of the terminal base 270 may be a hexagonal shape. Other polygon-shapes may be utilized for the terminal base 270, such as square, rectangle, pentagon, octagon, star, etc. The terminal head 272 may include a conoid shape or cone shape to help guide the metal terminal component 206 through the cover opening 280 of the enclosure cover 212.

Figure 7A:
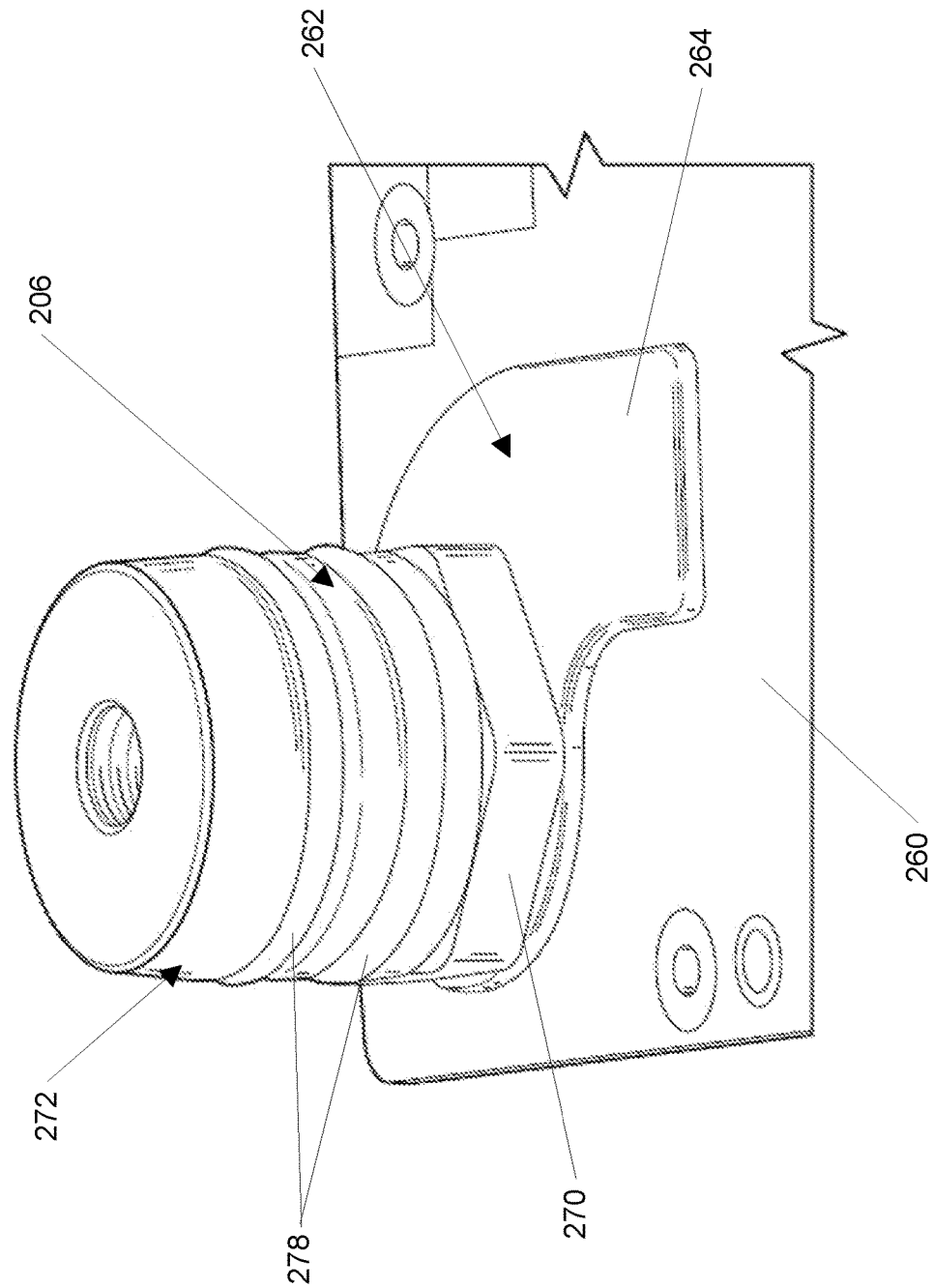
FIG. 7A shows a top perspective view of a metal terminal and printed control board assembly (PCBA) of the battery pack from FIG. 6 in accordance with an embodiment.
Figure 7B:
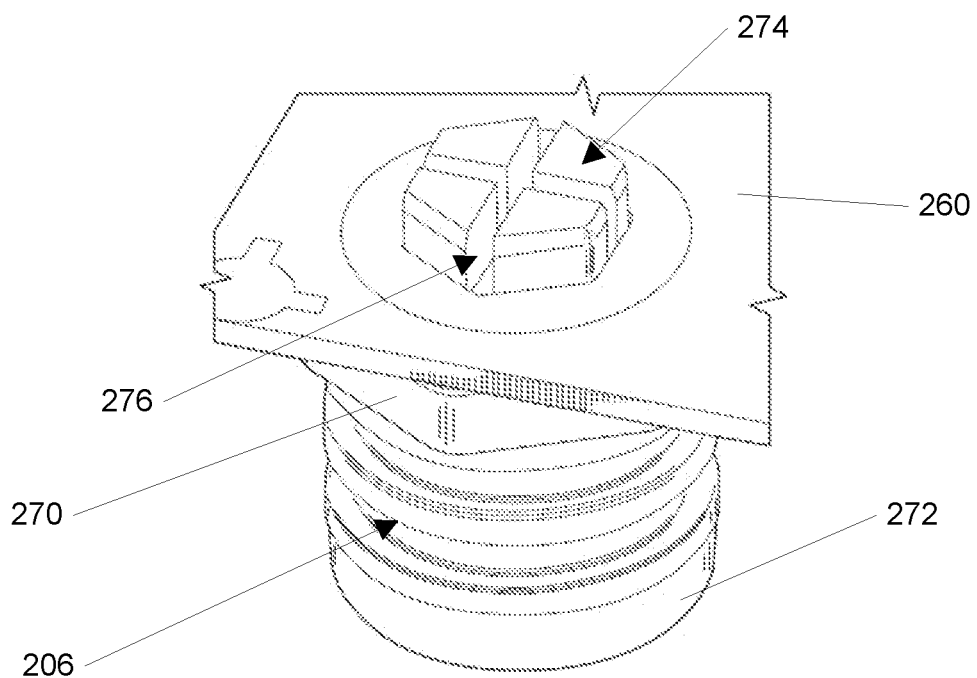
FIG. 7B shows a bottom perspective view of the metal terminal and PCBA from the battery pack from FIG. 7A in accordance with an embodiment.
Figure 7C:
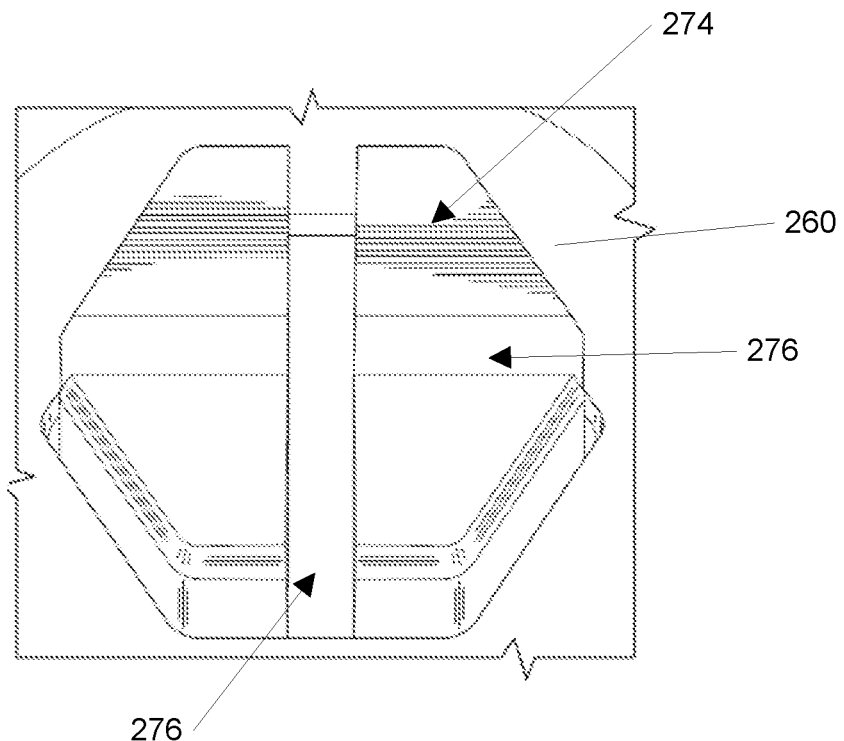
FIG. 7C shows a bottom view of a metal rod soldering head from the metal terminal from FIG. 7B in accordance with an embodiment.
Figure 8:
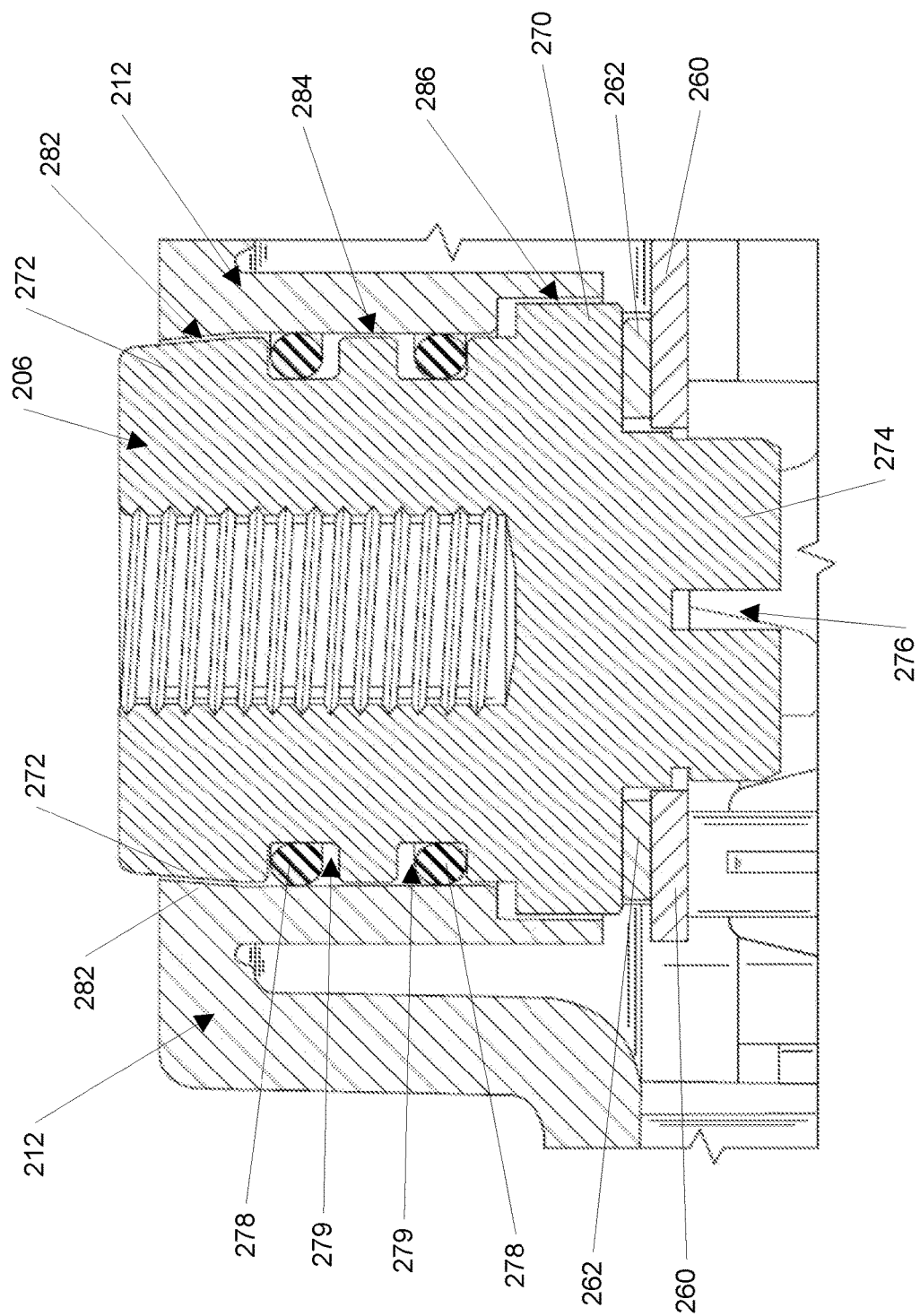
FIG. 8 shows a cross-sectional view of the metal terminal and PCBA from FIG. 7A in accordance with an embodiment.
Figure 9:
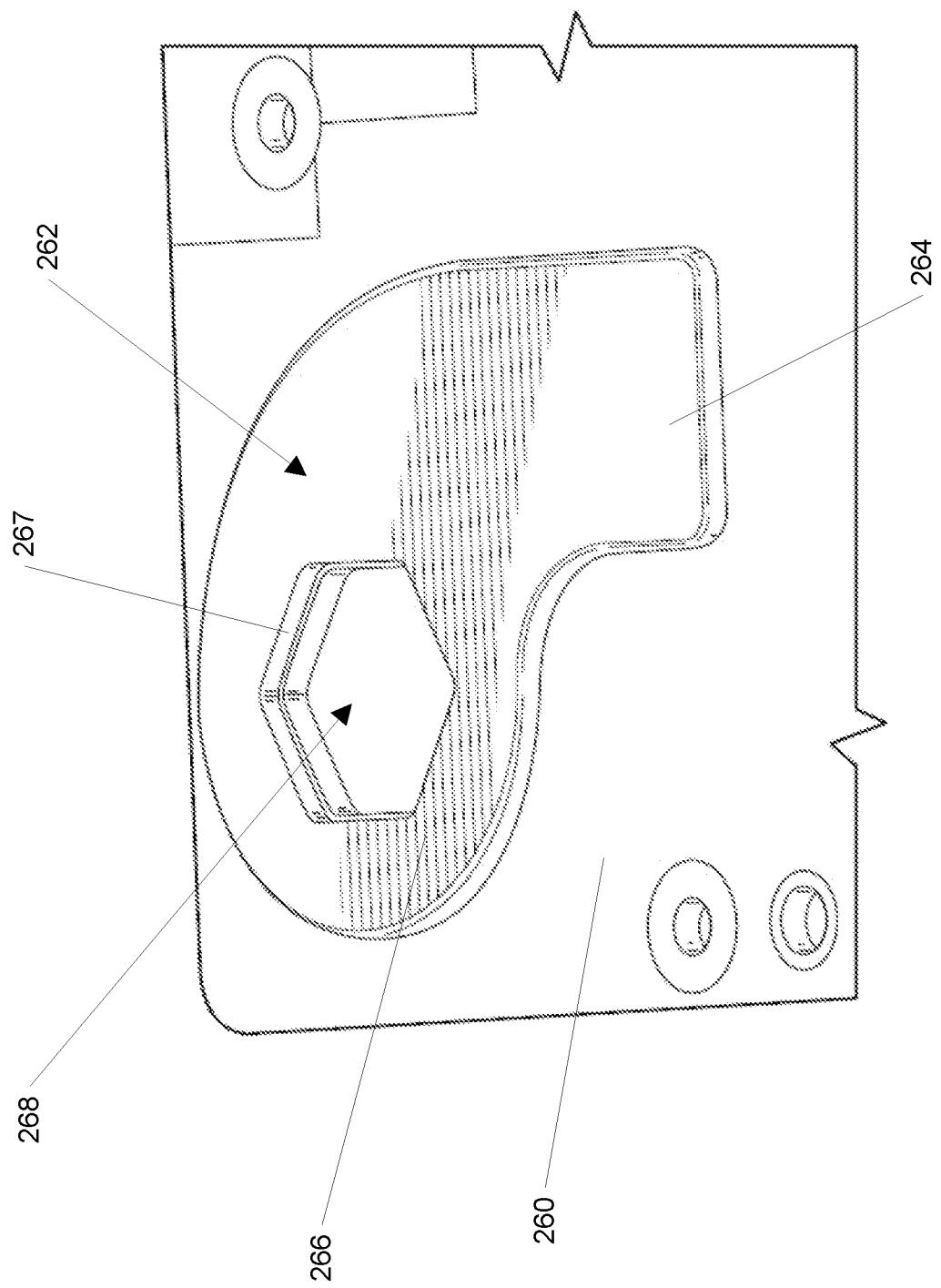
FIG. 9 shows a perspective view of a metal plate and the PCBA from FIG. 7A in accordance with an embodiment.
Figure 10:
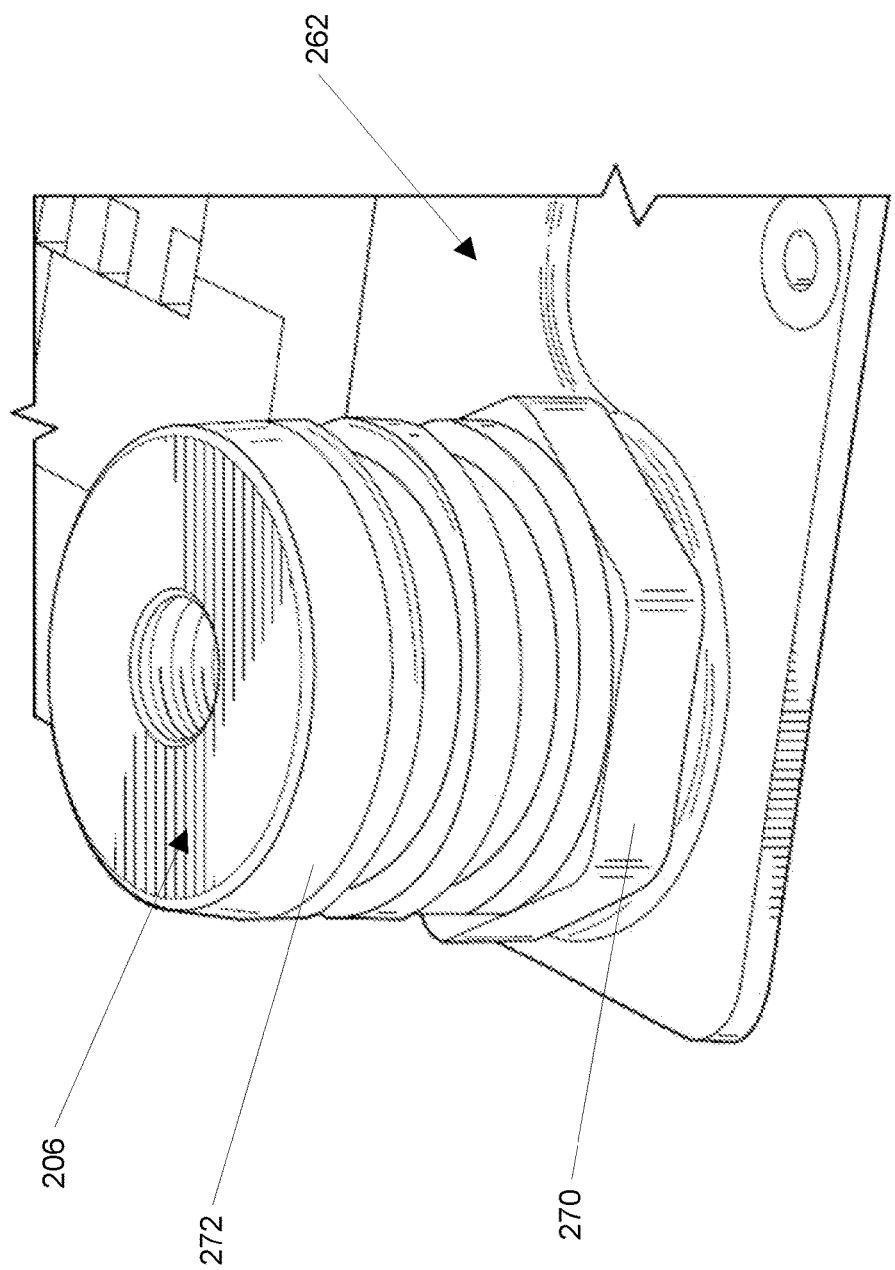
FIG. 10 shows another perspective view of the metal terminal and PCBA from FIG. 7A in accordance with an embodiment.

Additionally, as specifically illustrated in FIGS. 7B and 7C, the metal terminal component 206 may include a metal rod soldering head 274 that is located opposite the terminal head 272 of the metal terminal component 206. The metal rod soldering head 274 may fit inside each of the polygon-shaped opening 268 of the PCBA 260 and the polygon-shaped hole 267 of the metal plate 262. The metal rod soldering head 274 may be polygon-shaped to match the size and the shape of the polygon-shaped opening 268 of the PCBA 260 and the polygon-shaped hole 267 of the metal plate 262. The metal rod soldering head 274 may be hexagon shaped. Other polygon-shapes may be utilized for the metal rod soldering head 274 as long as the shape matches the polygon-shaped opening 268 of the PCBA 260 and the polygon-shaped hole 267 of the metal plate 262, such as square, rectangle, pentagon, octagon, star, etc. The metal rod soldering head 274 may include one or more grooves 276. The one or more grooves 276 may extend along the metal rod soldering head 274 to increase the welding force, torque force, and high impact force of the metal terminal component 206 within the battery pack 200. As illustrated in FIGS. 7B and 7C, the one or more grooves 276 may include two grooves that create a cross along the metal rod soldering head 274. The one or more grooves 276 may include other patterns and configurations, such as X, V, or other patterns and configurations for the metal rod soldering head 274.

Figure 11:
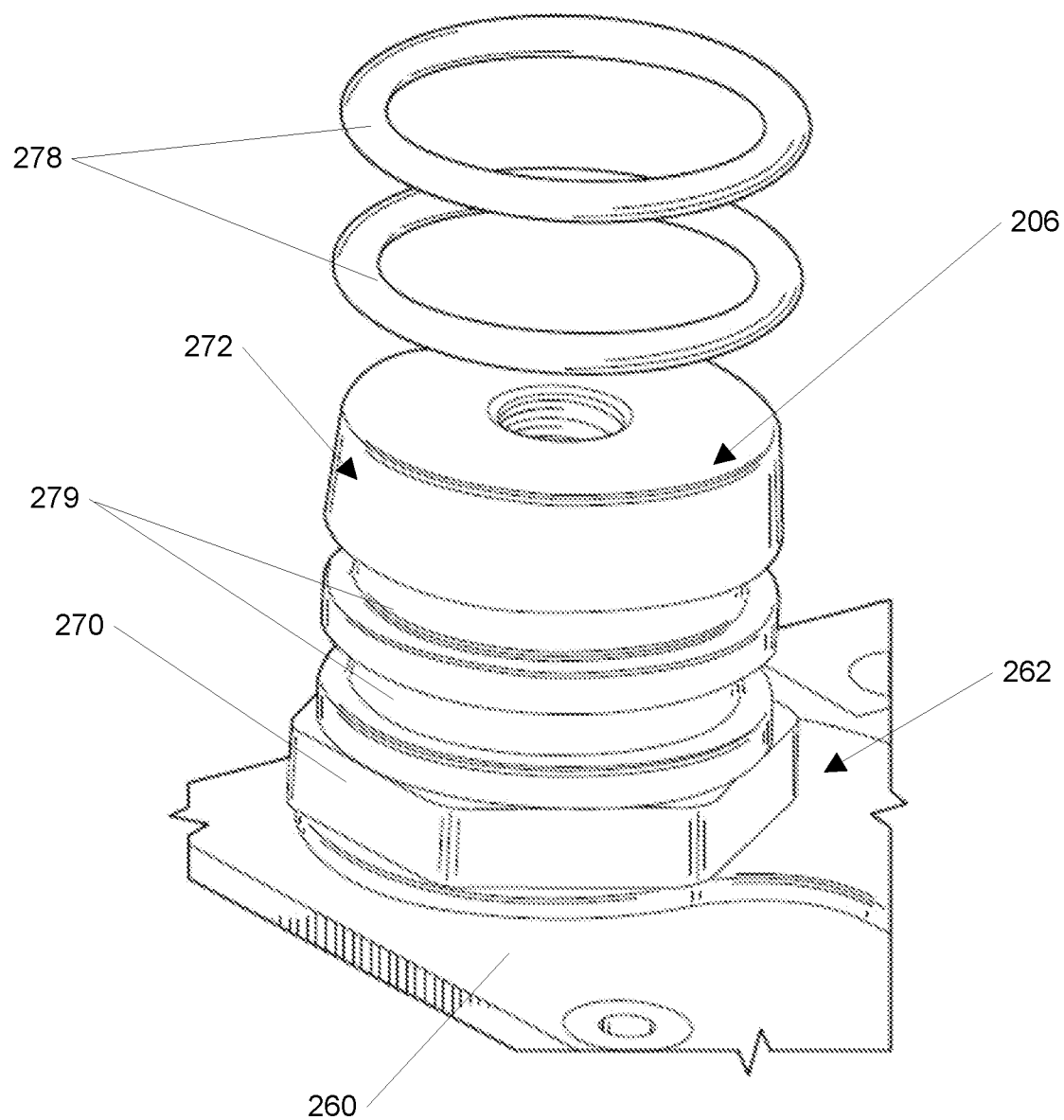
FIG. 11 shows an exploded component view of the metal terminal and PCBA from FIG. 7A in accordance with an embodiment.

Additionally, as illustrated in the FIGS. 7A and 11, the metal terminal component 206 may include one or more O-rings 278. The one or more O-rings 278 may include two O-rings in an embodiment. Other number of O-rings 278 may be utilized with other embodiments. The O-rings 278 may each be located on one or more circular grooves 279 extending around each of the metal terminal components 206. The grooves 279 may include a lubricating oil around the O-rings 278. When the cover opening 280 of the enclosure cover 212 fits over the metal terminal component 206, the O-rings 278 are located between the metal terminal component 206 and the cover opening 280 of the enclosure cover 212.

The O-rings 278 may provide a water ingress protection and a compliance with water ingress and waterproof tests and standards known and used in the industry, such as IPX7, for the battery pack 200. Further the O-rings 278 located around each of the metal terminal components 206 may match with the cover opening 280 of the enclosure cover 212 for water ingress protections and compliance with water ingress and waterproof tests and standards known and used in the industry, such as IPX7, for the battery pack 200. The IP Code, or Ingress Protection Code is defined in IEC standard 60529 which classifies and rates the degree of protection provided by mechanical casings and electrical enclosures against intrusion, dust, accidental contact, and water. It is published by the International Electrotechnical Commission (WC), The equivalent European standard is EN 60529. For example, IPX7 represents water "ingress protection" for protection against immersion, 1 meter or more depth, i.e. effective against the ingress of water in harmful quantity shall not be possible when the enclosure is immersed in water under defined conditions of pressure and time (up to 1 meter of submersion). The IPX7 test may include a test duration of 30 minutes and tested with the lowest point of the enclosure 1,000 mm below the surface of the water, or the highest point 150 mm below the surface, whichever is deeper.

As specifically illustrated in FIG. 6, the battery pack 200 may include an outer enclosure 210 that encases one or more battery cells and/or battery blocks (not shown). The battery pack 200 may include the enclosure cover 212 that fits over the top of the outer enclosure 210. The battery pack 200 may also include a handle 208 located on the enclosure cover 212.

Figure 12:
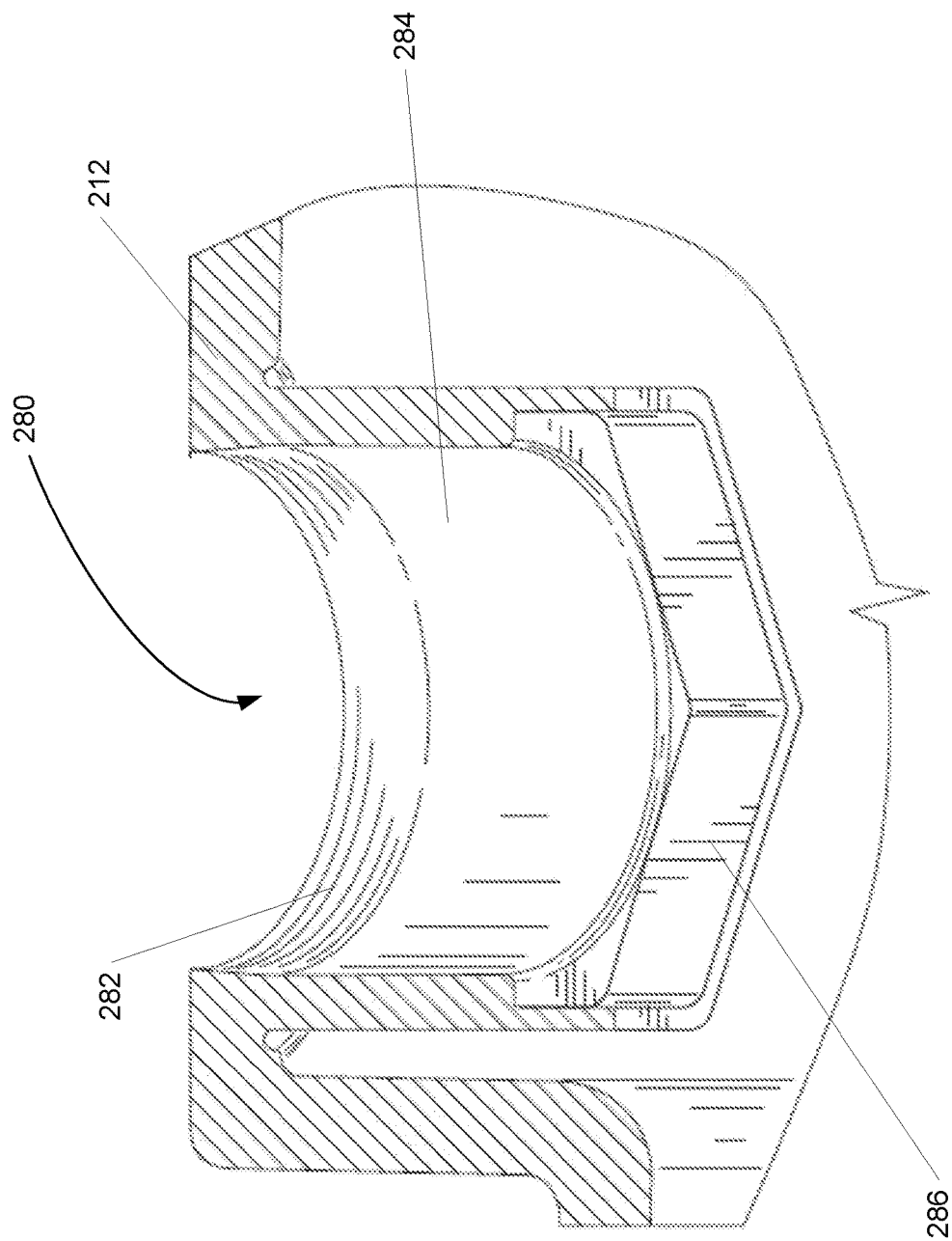
FIG. 12 shows a cross-sectional view of a cover hole of an enclosure cover of the battery pack from FIG. 6 in accordance with an embodiment.

Further, the enclosure cover 212 may include one or more openings or cover holes 280 that are sized and configured to fit over the metal terminals 206 of the battery pack 200. In one embodiment, the one or more cover holes 280 will include two cover holes to cover two metal terminal components 206. Other numbers of cover holes 280 may be utilized as required to match, cover, and fit over the metal terminal components 206 for the battery pack 200. Each of the cover holes 280 on the enclosure cover 212 may slide over and tightly fit around each of the metal terminals 206. FIG. 12 illustrates a cross-sectional view of the inside of the one or more cover holes 280. As illustrated in FIG. 12, the cover holes 280 on the enclosure cover 212 may include a top portion 282, a middle portion 284, and a bottom portion 286. The top portion 282 may include a gradient circular opening to fit over and match the conoidal shape of the terminal head 272 of the metal terminal 206. The middle portion 284 may be a straight-edge circular opening to fit over and match the metal terminal 206. The bottom portion 286 may include a polygon-shaped opening to fit over and match the polygon-shape of the terminal base 270 of the metal terminal 206. The polygon-shaped opening of the bottom portion 286 may be a hexagon shape. Other polygon-shapes may be utilized for the polygon-shaped opening of the bottom portion 286, such as square, rectangle, pentagon, octagon, star, etc.

According to another aspect of the embodiments, as detailed below and illustrated in FIGS. 13A-21, a large-format, rechargeable battery (e.g., a Li-ion large-format battery pack) used for powering attached equipment (e.g., an end device) may include a thermistor temperature sensor holder to quickly secure/attach a thermistor temperature sensor (such as a negative temperature coefficient (NTC) thermistor temperature sensor or a positive temperature coefficient (PTC) thermistor temperature sensor) to a battery cell of a plurality of battery cells of the large-format battery pack configured for electrically powering the end device. The thermistor temperature sensor holder may be referred to as a thermistor temperature sensor clip, NTC/PTC holder, or NTC/PTC clip without departing from this invention. The thermistor temperature sensor may be utilized to measure an external temperature of the battery cell of the plurality of battery cells within the large-format, rechargeable battery. The thermistor temperature sensor may be an important component used for large-format, rechargeable battery charging and safety. The thermistor temperature sensor provides critical temperature data useful for keeping the large-format, rechargeable battery in the optimum condition during the charging cycle. Careful management of temperature during charging prolongs battery life and avoids hazards inherent to large-format, rechargeable batteries. Therefore, it is important that the thermistor temperature sensor is located by the thermistor temperature sensor holder at or near an advantageous and favorable location along an outside edge of one or more battery cells to provide a controller the critical temperature data of the battery cells. In another aspect of the invention, the thermistor temperature sensor holder may be either a NTC or PTC temperature sensor holder or another temperature sensor holder to quickly secure/attach an NTC or PTC thermistor temperature sensor or another thermistor or temperature sensor to the large-format, rechargeable battery may include a temperature.

For example, the thermistor temperature sensor holder, in accordance with an embodiment, may replace a current solution of using tape or glue to fix the thermistor temperature sensor to one or more battery cells, which may be difficult to add tape or glue. The features may include a temperature sensor holder to fix/secure/attach the thermistor temperature sensor to the battery cell quickly that holds the thermistor temperature sensor in place. Additionally, the temperature sensor holder may locate the thermistor temperature sensor at the precise and/or correct height against the exterior of the battery cell for measuring the external temperature of the battery cell. One potential benefit using the temperature sensor holder to fix/secure/attach the thermistor temperature sensor would be a significant reduction in worker hours that would previously be used to glue/tape the thermistor temperature sensor to the one or more battery cells. Another potential benefit may be increasing the accuracy of the fixing location along the outside edge of the battery cell as the temperature sensor holder repetitively provides the ability to repeatedly place the thermistor temperature sensor at the ideal or favorable location for the thermistor temperature sensor along the outside edge of the battery cell. Another potential benefit may be the ability to implement and secure the thermistor temperature sensor in a narrow and/or difficult to access position located within the large-format, rechargeable battery.

For the embodiment of FIGS. 13A-21, the features of the battery pack 300 are referred to using similar reference numbers under the "3XX" series of reference numerals, rather than "1XX" or "2XX" as used for the battery pack 100 in the embodiments of FIGS. 1-5 and/or the battery pack 200 in embodiments of FIGS. 6-12. A "1XX"/"2XX" feature may be similar to "3XX" feature. Accordingly, certain features of the battery pack 300 that were already described above with respect to the battery pack 100 of FIGS. 1-5 and/or the battery pack 200 of FIGS. 6-12 may be described in lesser detail, or may not be described at all. Further, any combination of the features of the battery pack 100 and/or battery pack 200 may be utilized with the battery pack 300. Vice versa, any combination of the features of the battery pack 300 may be utilized with the battery pack 100 and/or battery pack 200.

Figure 13A:
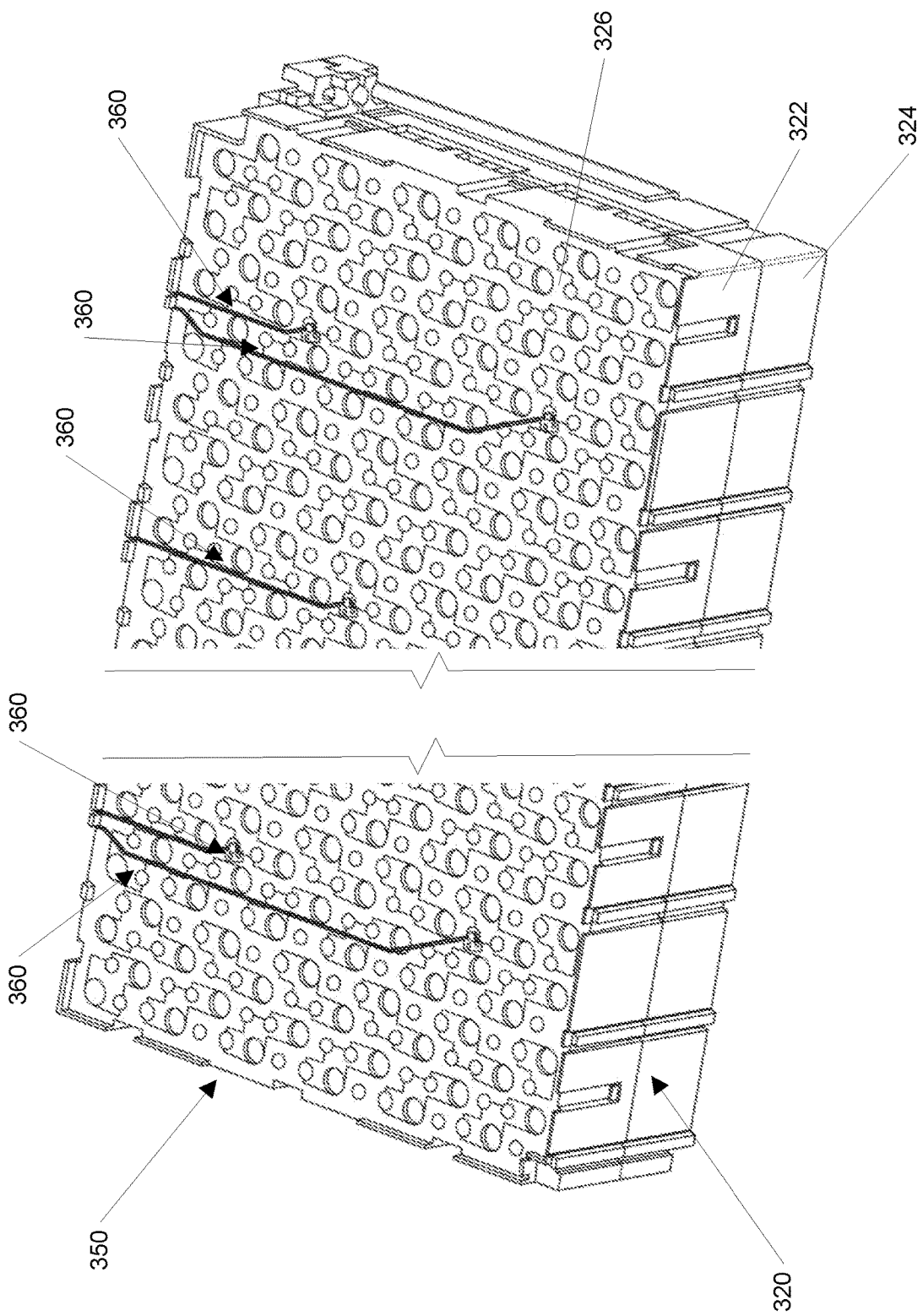
FIG. 13A shows a top perspective broken view of the internal components of a battery pack with temperature sensor holders for NTC thermistor temperature sensors attached to battery cells in accordance with an embodiment.
Figure 14A:
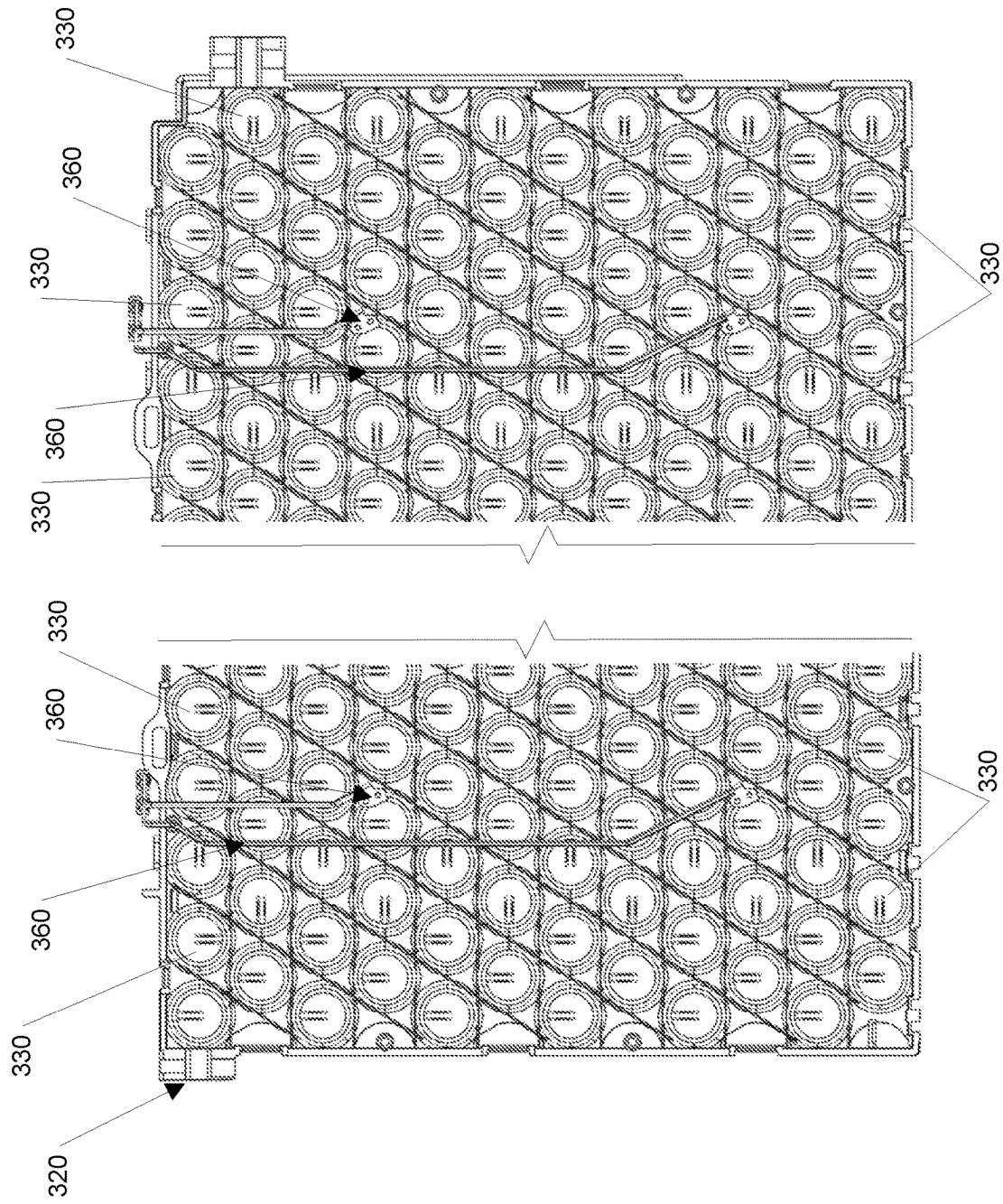
FIG. 14A shows a top broken view of the internal components of the battery pack with the NTC thermistor temperature sensors attached to battery cells from FIG. 13A in accordance with an embodiment.
Figure 14B:
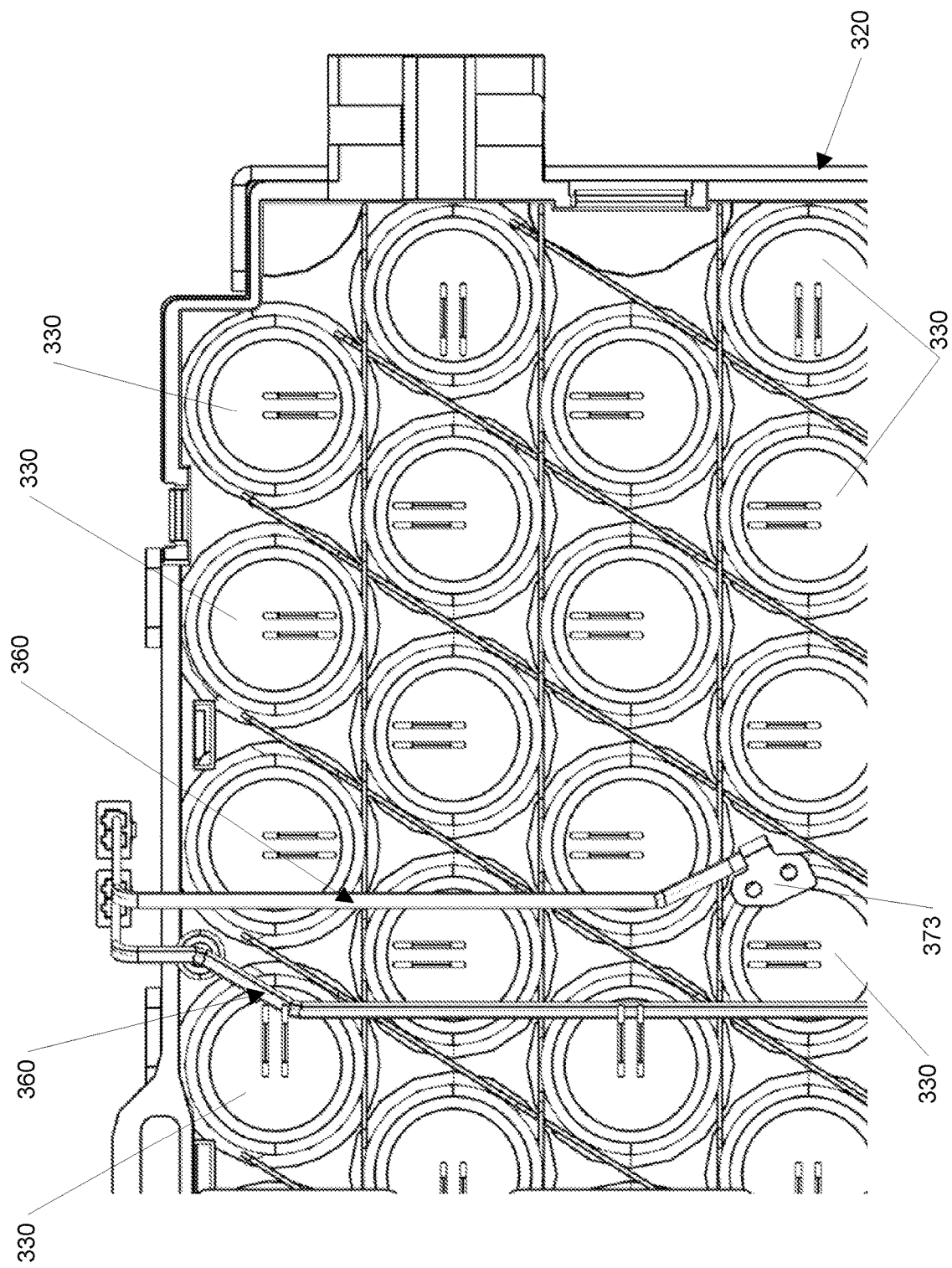
FIG. 14B shows a close-up view of a temperature sensor holder for an NTC thermistor temperature sensor attached to a battery cell from FIG. 14A in accordance with an embodiment.

As illustrated in FIGS. 13A and 14A, the battery pack 300 includes features to quickly secure/attach a negative temperature coefficient (NTC) thermistor temperature sensor assembly 360 to a battery cell 330 of the large-format battery pack 300 configured for electrically powering an end device. The battery pack 300 may include an outer enclosure (not shown) comprising a battery cell holder 320 configured to hold a plurality of battery cell modules. The battery cell holder 320 may include a top cover 322 and a bottom holder 324. The battery cell holder 320 may also include a cell holder cover 326 located over the battery cells 330 and along the top cover 322. The battery pack 300 may include a plurality of battery cells 330. The top cover 322 and the bottom holder 324 may fit together to hold the battery cells 330 with the cell holder cover 326 over the top (e.g., negative terminal(s) of the battery cells 330). Each battery cell 330 of the plurality of battery cells may be fixed within a battery cell module of the plurality of battery cell modules. The plurality of battery cells 330 may be arranged in the battery cell holder 320 in a parallel configuration to form a battery block 350. FIG. 14A shows a top view of the internal components of the battery pack 300 without the top cover 322 and the cell holder cover 326 with the NTC thermistor temperature sensor assemblies 360 attached to battery cells 330.

As illustrated in FIG. 13A, the battery cell holder 320 with the battery cells 330 may form a battery block 350. The battery pack 300 may include various battery blocks 350 that fit within the outer enclosure case of the battery pack 300. The outer enclosure case may include a plurality of battery blocks 350 electrically connected to provide power for the battery pack 300.

Additionally, the battery cells 330 may include an outer tube extending around the body of each of the battery cells 330. The outer tube may provide thermal insulation to each of the battery cells 330. The outer tube may also be an outer mica tube to provide thermal insulation to the battery cells 330. The outer tube (or mica tube) may wrap around the battery cell 330 for the majority of the length.

Figure 13B:
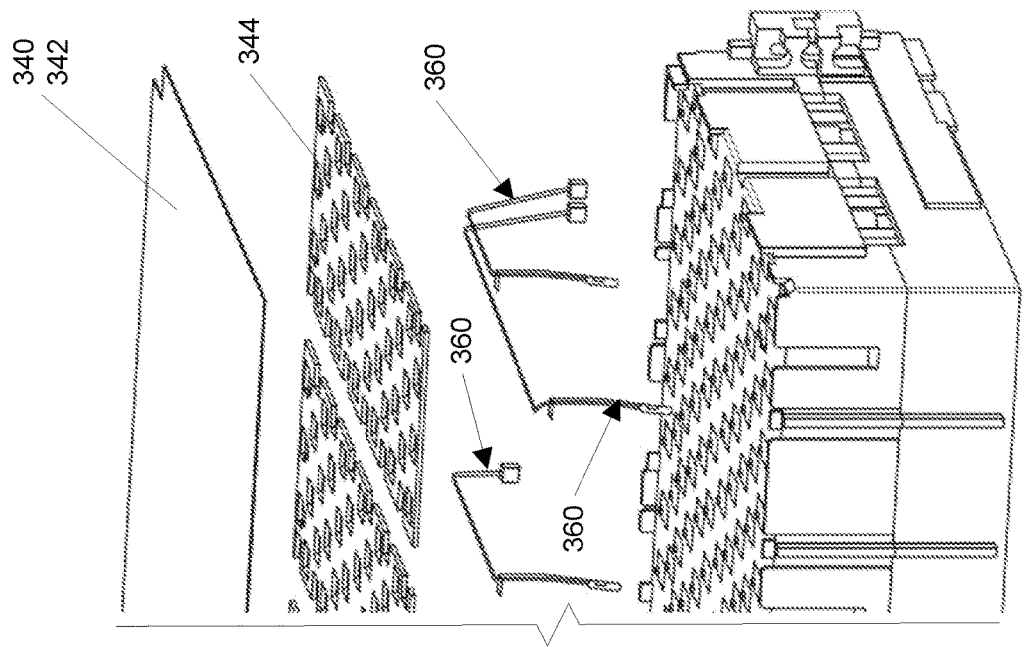
FIG. 13B shows an exploded perspective broken view of the internal components of the battery pack with the temperature sensor holders for the NTC thermistor temperature sensors attached to battery cells from FIG. 13A in accordance with an embodiment.
Figure 13B:
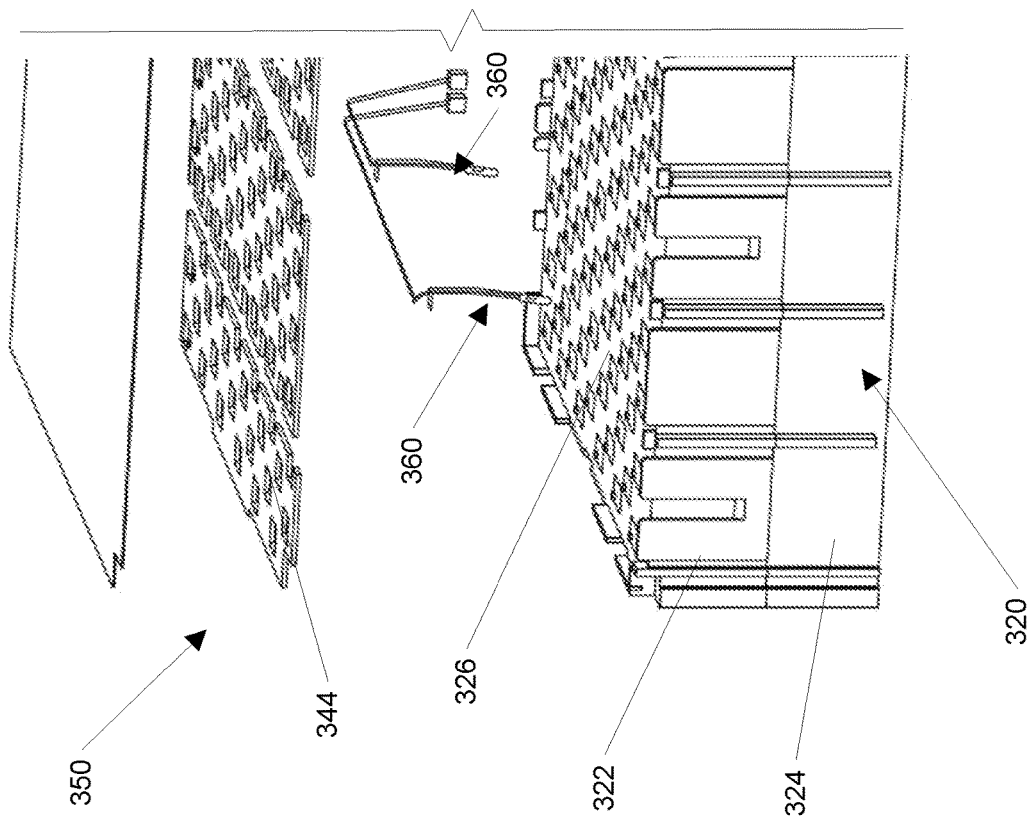
Figure 13C:
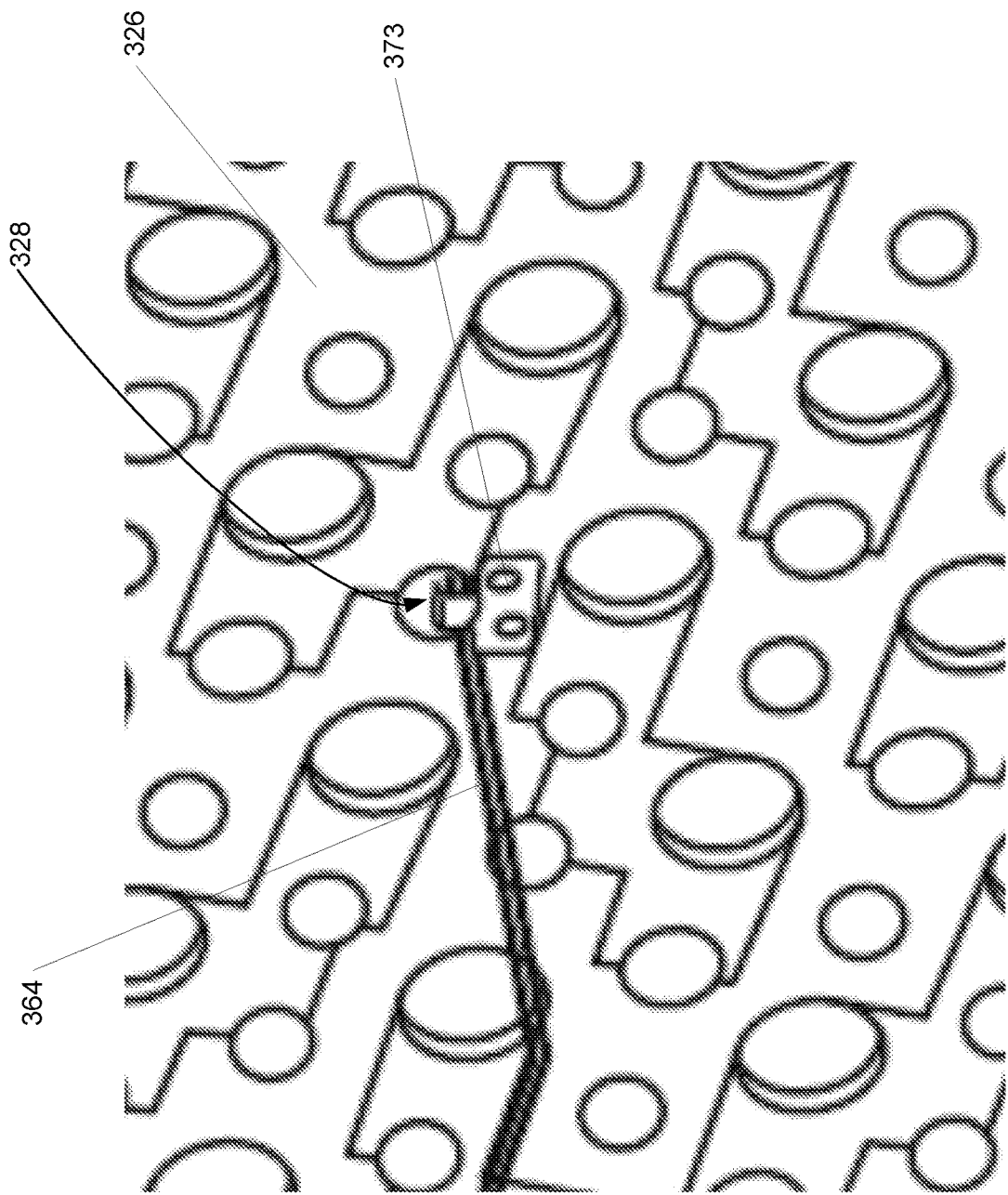
FIG. 13C shows a close-up view of a temperature sensor holder for an NTC thermistor temperature sensor attached to a battery cell from FIG. 13A in accordance with an embodiment.

FIG. 13B shows an exploded perspective view of the internal components of the battery pack 300 with a battery block 350 with a battery cell holder 320 that includes a top cover 322 and a bottom holder 324, a plurality of NTC thermistor temperature sensor assemblies 360, and one or more conductor plates 344. The top cover 322 may include a cell holder cover 326 that is located on top of the battery cells 330. One or more conductor plates 344 may be placed on top of the cell holder cover 326. The one or more conductor plates 344 may be an aluminum plate. The one or more conductor plates 344 may help hold the NTC thermistor temperature sensor assemblies 360 in place. In some embodiments, a mica plate or mica sheet 340, 342 may be secured to a top surface of the one or more conductor plates 344. The mica plate or mica sheet 340, 342 may be similar to the one or more plates 140, 142 as described above with FIGS. 4 and 5. As shown in FIGS. 13B and 13C, the plurality of NTC thermistor temperature sensor assemblies 360 may be located and extend through an access hole 328 of the cell holder cover 326 on the top cover 322.

Figure 15:
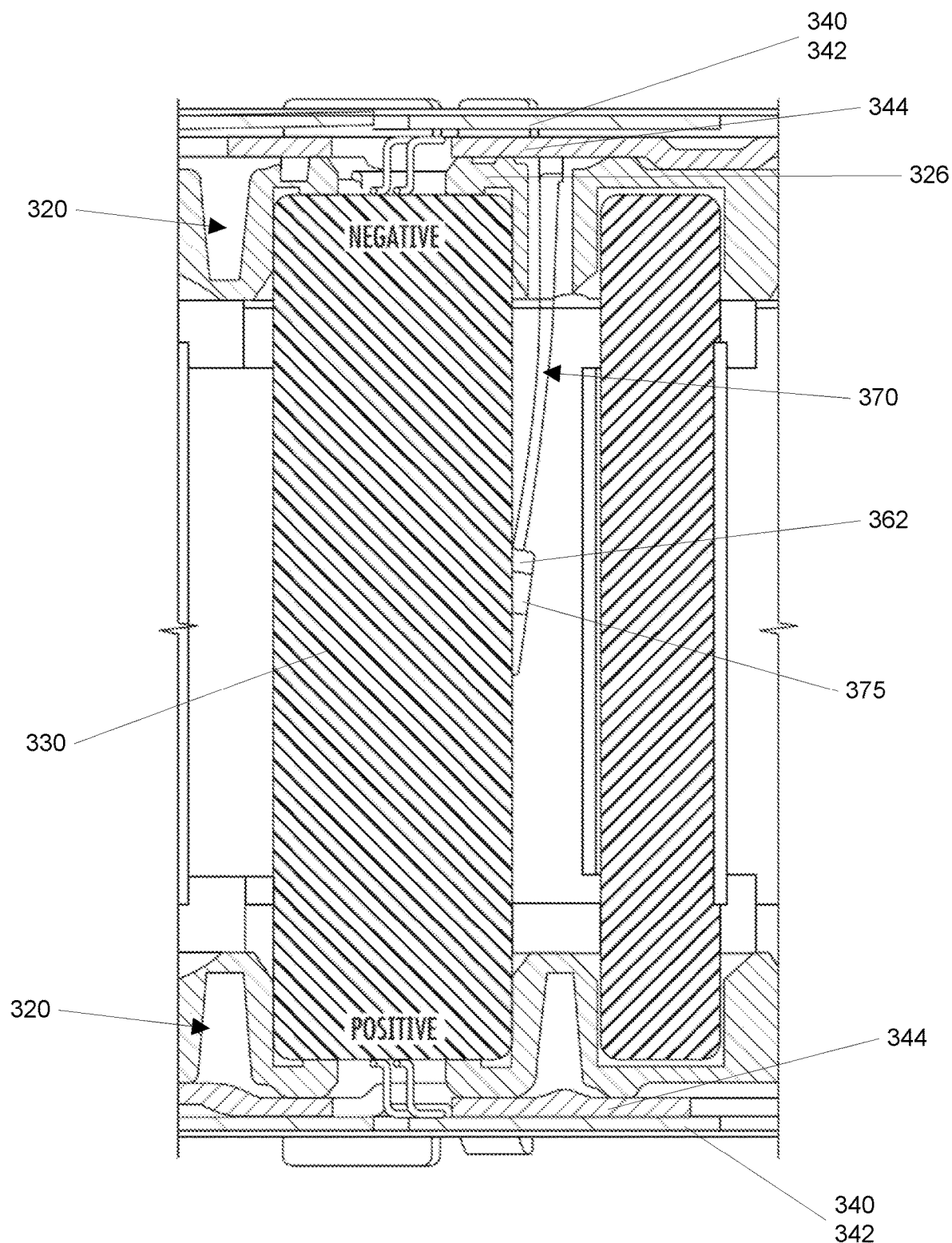
FIG. 15 shows a vertical cross-sectional view of a battery cell and the NTC thermistor temperature sensor and the temperature sensor holder attached to the battery cell from FIG. 13A in accordance with an embodiment.
Figure 17A:
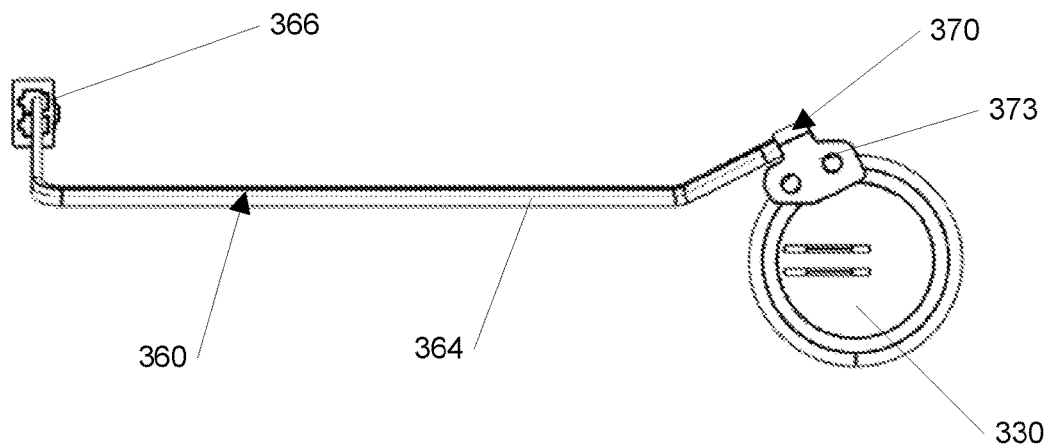
FIG. 17A shows a top view of the NTC thermistor temperature sensor and a temperature sensor holder attached to a battery cell from FIG. 13A in accordance with an embodiment.
Figure 17B:
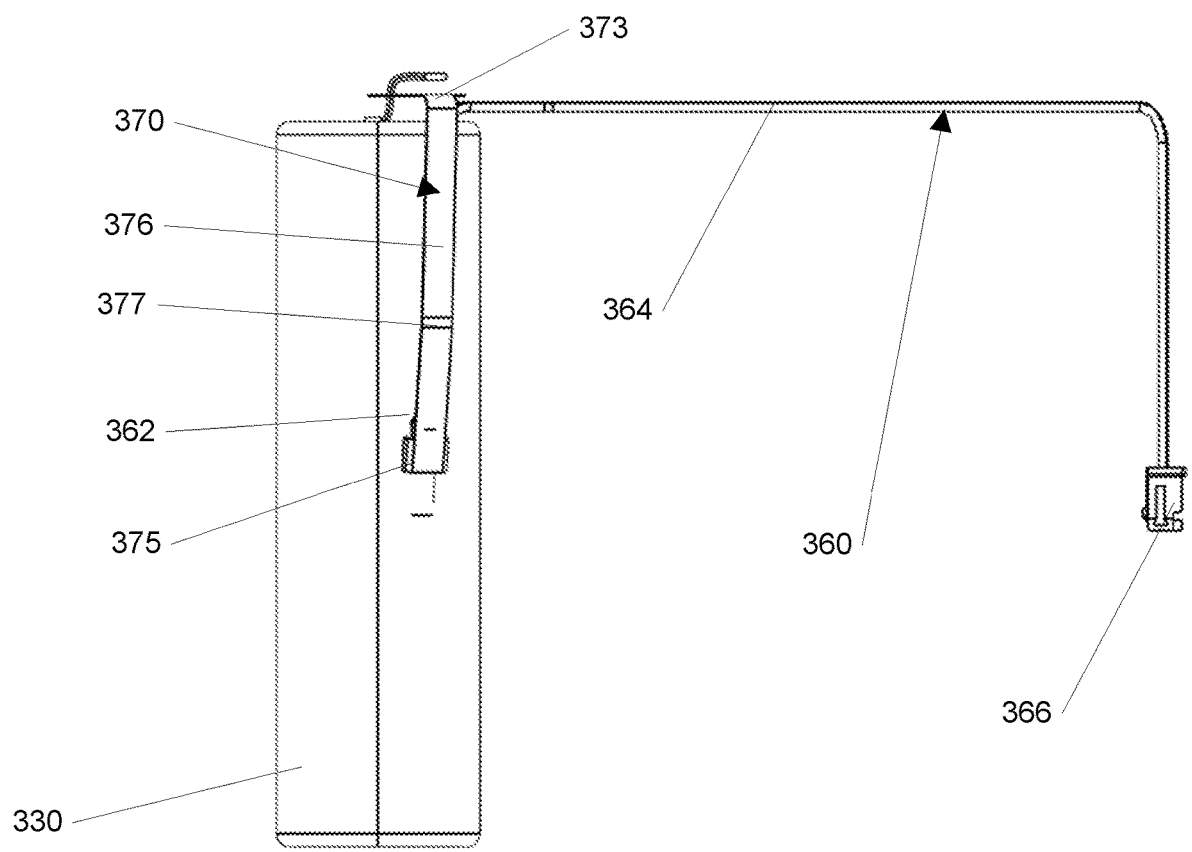
FIG. 17B shows a side view of the NTC thermistor temperature sensor and the temperature sensor holder attached to a battery cell from FIG. 17A in accordance with an embodiment.
Figure 18:
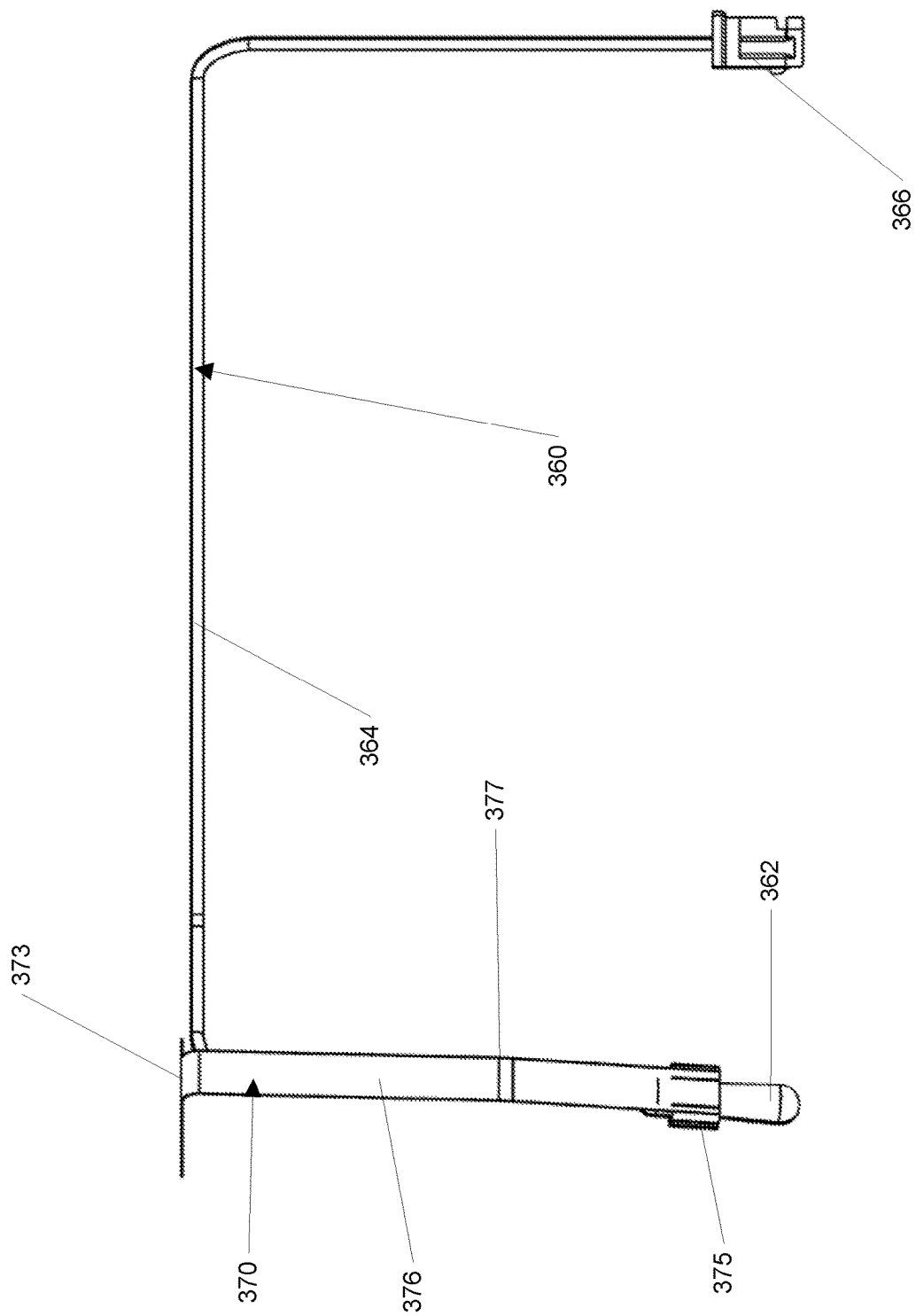
FIG. 18 shows a side view of the NTC thermistor temperature sensor and the temperature sensor holder from FIG. 17A in accordance with an embodiment.

FIGS. 15, 17A, and 17B illustrate an exemplary NTC thermistor temperature sensor assemblies 360 connected to a battery cell 330. FIG. 18 illustrates just the NTC thermistor temperature sensor assembly 360. The NTC thermistor temperature sensor assembly 360 may include an NTC thermistor temperature sensor 362, a wire 364, an electrical connector 366, and a temperature sensor holder 370. The NTC thermistor temperature sensor 362, wire 364, and electrical connector 366 may be similar to those known and used in the art. The NTC thermistor temperature sensor 362 may be positioned adjacent to a longitudinal side of a battery cell 330 to measure an external temperature of the battery cell 330.

FIGS. 20A-20D illustrate an exemplary temperature sensor holder 370. The temperature sensor holder 370 may also be referred to an NTC clip or a temperature sensor clip. The temperature sensor holder 370 may include a first end 372, a second end 374 opposite the first end 372, and a rod 376 extending between the first end 372 and the second end 374. The temperature sensor holder 370 may hold the NTC thermistor temperature sensor 362 and position the NTC thermistor temperature sensor 362 adjacent to the battery cell 330 to measure the external temperature of the longitudinal side of the battery cell 330.

Figure 16A:
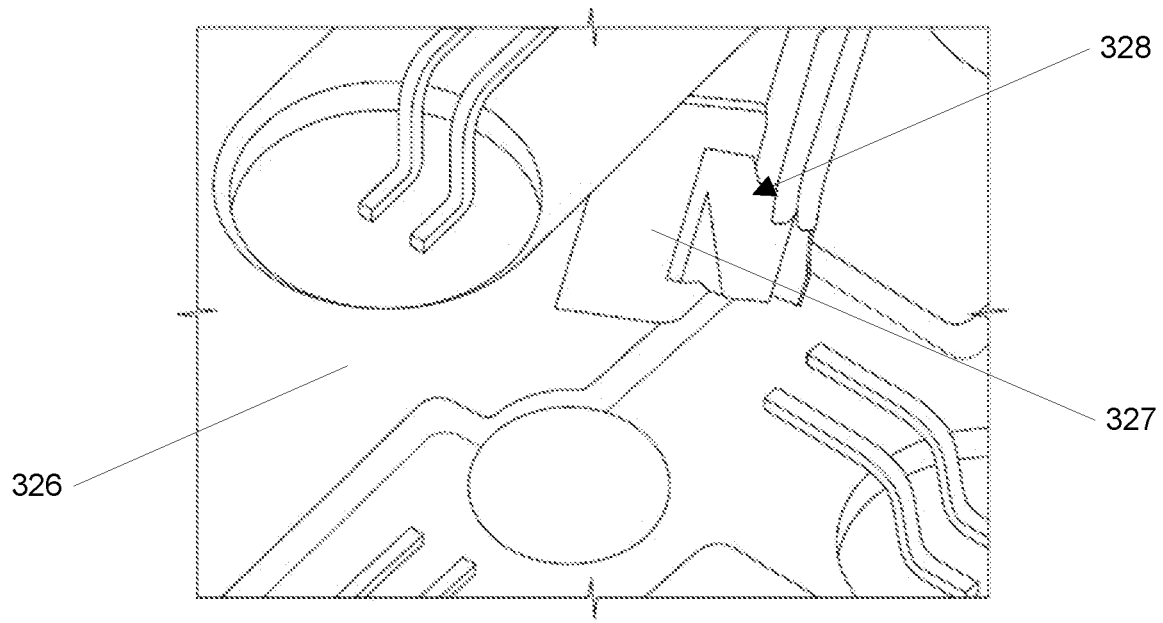
FIGS. 16A and 16B show a perspective close-up top view of a cell holder cover and a temperature sensor holder for an NTC thermistor temperature sensor secured on the top of the cell holder cover from FIG. 13A in accordance with an embodiment.
Figure 16B:
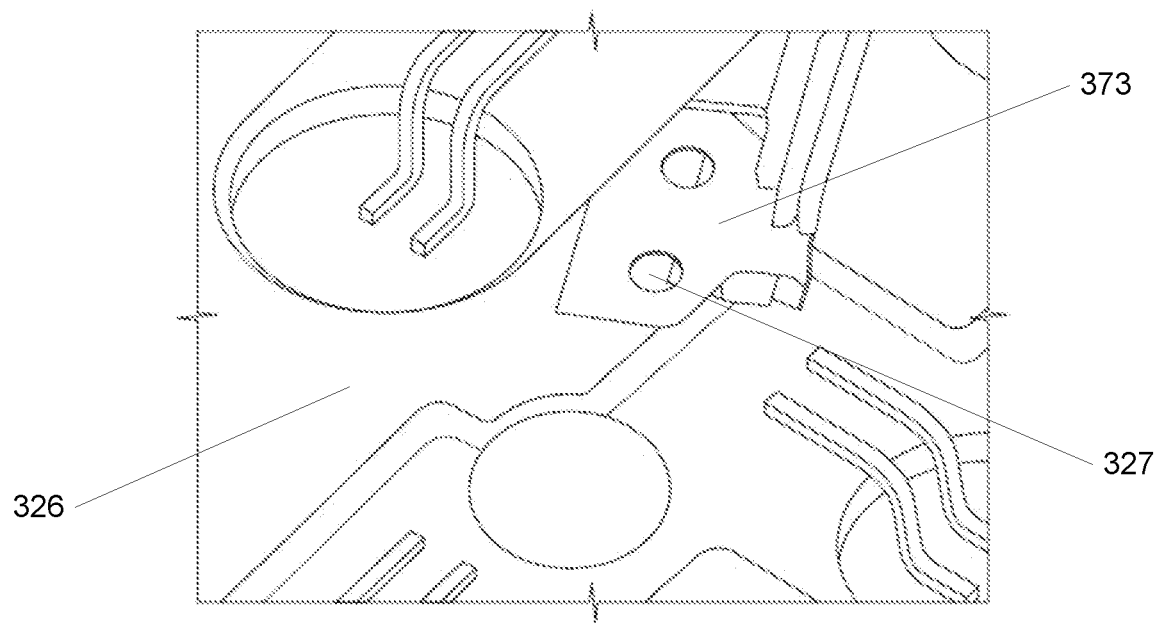

The first end 372 of the temperature sensor holder 370 may include a tab 373. The tab 373 may affix the temperature sensor holder 370 to the cell holder cover 326 adjacent a terminal of the battery cell 330. FIGS. 16A and 16B illustrate views of the cell holder cover 326 and the tab 373 from the temperature sensor holder 370 secured on the top of the cell holder cover 326. As illustrated in FIGS. 16A and 16B, the cell holder cover 326 may include an indentation 327. The indentation 327 may be sized and shaped to match a size and shape of the tab 373 on the temperature sensor holder 370. When the tab 373 is affixed to and located in the indentation 327 of the cell holder cover 326, the temperature sensor holder 370 may be secured in position because of the matching of the size and shape of the tab 373 within the indentation 327. For example, in some embodiments, the tab 373 may include an angled edge 373A, a corner edge 373B, and one or more holes 373C that help to secure the temperature sensor holder 370 in position with the cell holder cover 326 and such that an opposite end of the temperature sensor holder 370 is positioned against the external side of the battery cell 330. The angled edge 373A, the corner edge 373B, and the one or more holes 373C may match the indentation 327 of the cell holder cover 326. The tab 373 and the indentation 327 may include various other sizes, shapes, and/or keys.

The second end 374 of the temperature sensor holder 370 may include a clip portion 375. The clip portion 375 of the temperature sensor holder 370 may attach to the NTC thermistor temperature sensor 362. The clip portion 375 may be any clip or attaching mechanism to hold the NTC thermistor temperature sensor 362 in place at the second end 374 of the temperature sensor holder 370. In the exemplary embodiment illustrated in FIGS. 20A-20D, the clip portion 375 may include two biasing arms 375A that push against and clip the NTC thermistor temperature sensor 362 in place at the second end 374 of the temperature sensor holder 370. Other configurations and attaching mechanisms of the clip portion 375 may be utilized without departing from this invention. Additionally, the second end 374 of the temperature sensor holder 370 along with the NTC thermistor temperature sensor 362 may extend through an access hole 328 in the cell holder cover 326 when the tab 373 is secured in the indentation 327.

Figure 20B:
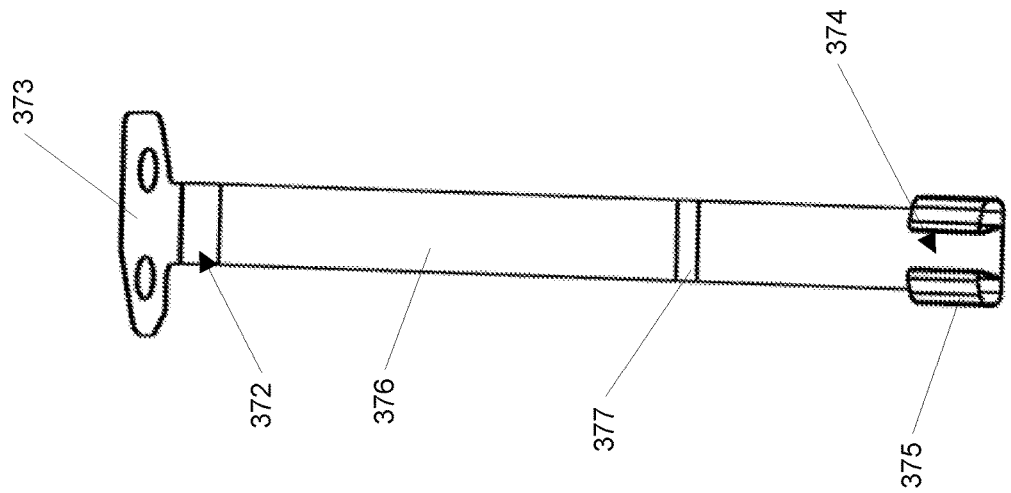
FIGS. 20A-20D show various views of the temperature sensor holder from FIG. 17A in accordance with an embodiment.
Figure 20A:
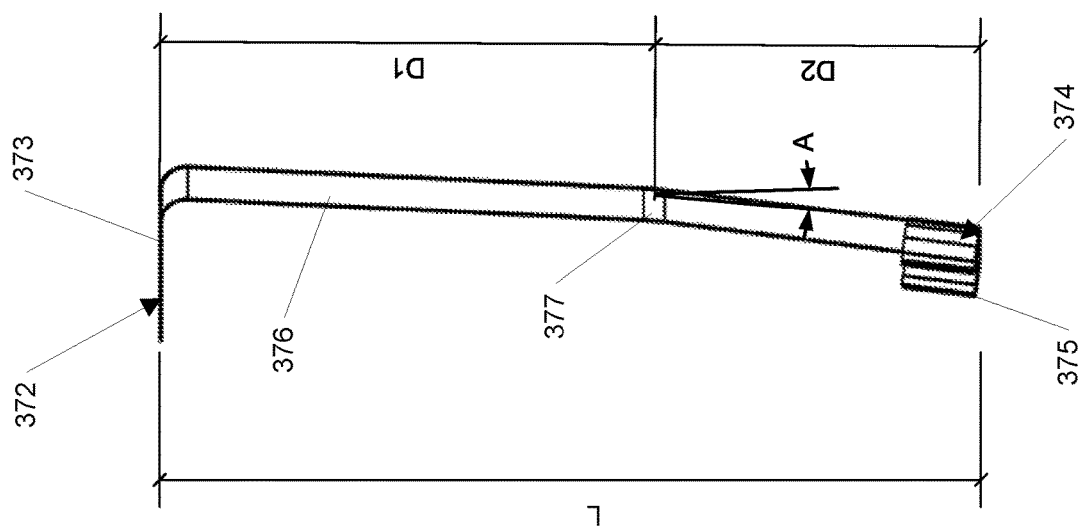
Figure 20D:
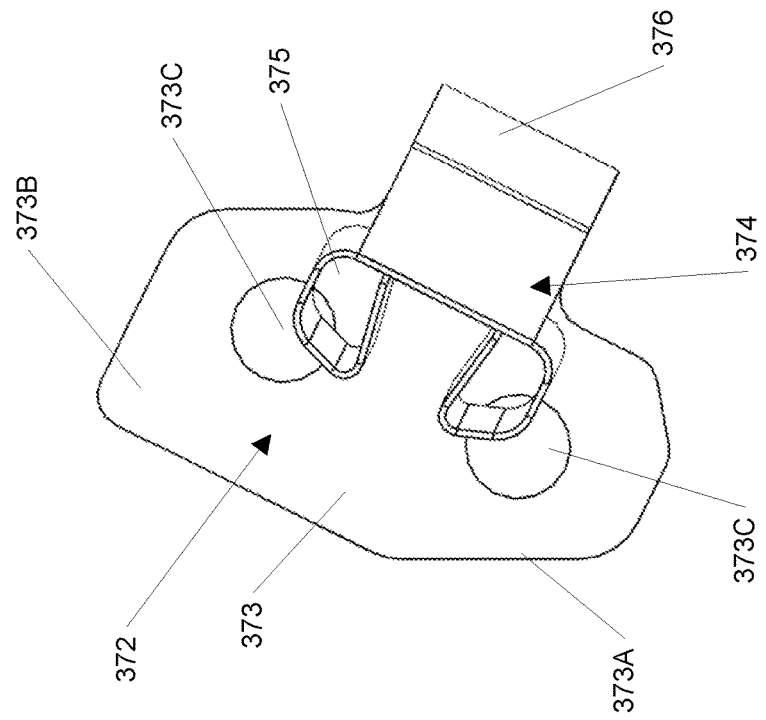
Figure 20C:
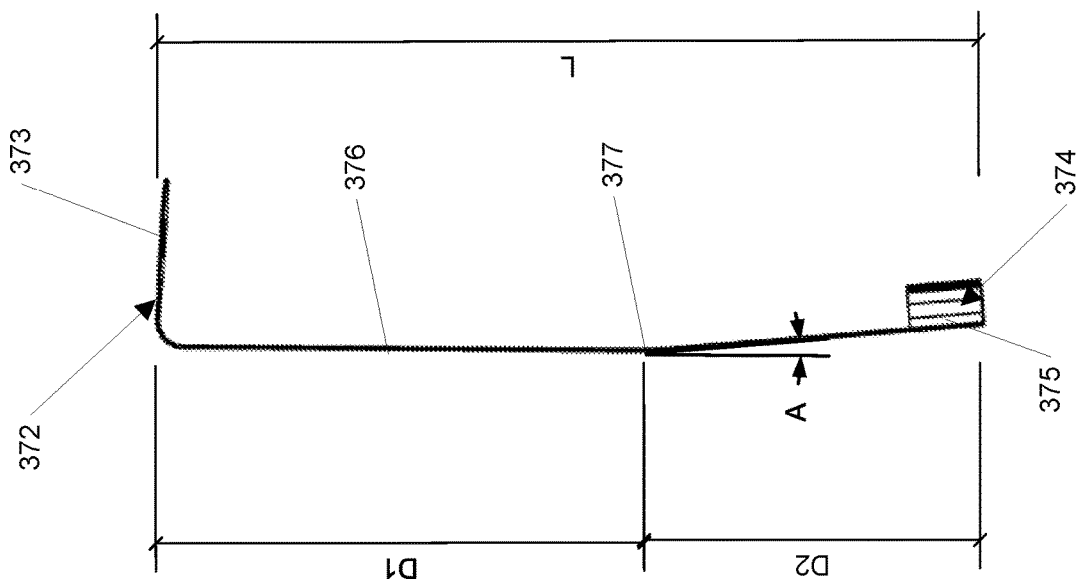

As illustrated in FIGS. 20A-20C, the rod 376 of the temperature sensor holder 370 may extend between the first end 372 and the second end 374 of the temperature sensor holder 370. The rod 376 may be a flat structure extending between the first end 372 and the second end 374. The rod 376 may be other shapes and sizes without departing from the invention. The rod 376 may be positioned adjacent to a longitudinal side of the battery cell 330. The rod 376 may extend through an access hole 328 in the cell holder cover 326 to position the NTC thermistor temperature sensor 362 adjacent to the longitudinal side of the battery cell 330. The rod 376 may comprise an angular bend 377. The angular bend 377 may be configured to provide a biasing force to the second end 374 and the NTC thermistor temperature sensor 362 in a direction of the longitudinal side of the battery cell 330. The angular bend 377 of the rod 376 may include an angle A as illustrated in FIGS. 20A and 20C. As illustrated in the exemplary of embodiment, the angle A of the angular bend 377 may be approximately 5 degrees. The angle A of the angular bend 377 may be other angles without departing from the invention, such as 2.5 degrees, 10 degrees, 15 degrees, or 20 degrees. Other angles between 2.5 degrees and 45 degrees may be utilized without departing from the invention. In another embodiment, the rod 376 may include a curved bend in the place of the angular bend 377 to provide a biasing force to the second end 374 and the NTC thermistor temperature sensor 362 in a direction of the longitudinal side of the battery cell 330.

Further, the location of the angular bend 377 on the rod 376 may include a distance, D1, from the first end 372 and a distance, D2, from the second end 374. In the exemplary embodiment, D1 may be approximately 20 millimeters between the first end 372 and the angular bend 377. In the exemplary embodiment, D2 may be approximately 15 millimeters between the second end 374 and the angular bend 377. Other distances may be utilized for D1 and D2 without departing from the invention, which may vary based on different variables, such as length of the longitudinal side of the battery cell 330, location of the NTC thermistor temperature sensor 362 along the longitudinal side of the battery cell 330, or type of NTC thermistor temperature sensor 362, etc. Additionally, the angular bend 377 of the rod 374 may provide a biasing force to ensure the NTC thermistor temperature sensor 362 remains in contact with the longitudinal side of the battery cell 330.

As illustrated in FIGS. 20A-20C, the rod 376 may include a length, L. The length, L, may position the NTC thermistor temperature sensor 362 along the longitudinal side of the battery cell 330 for favorable measurement of the external temperature of the battery cell 330. In an exemplary embodiment, the length L of the rod 376 may be approximately 30-35 millimeters. Other lengths may be utilized for L without departing from the invention, which may vary based on different variables, such as length of the longitudinal side of the battery cell 330, location of the NTC thermistor temperature sensor 362 along the longitudinal side of the battery cell 330, or type of NTC thermistor temperature sensor 362, etc.

Figure 19A:
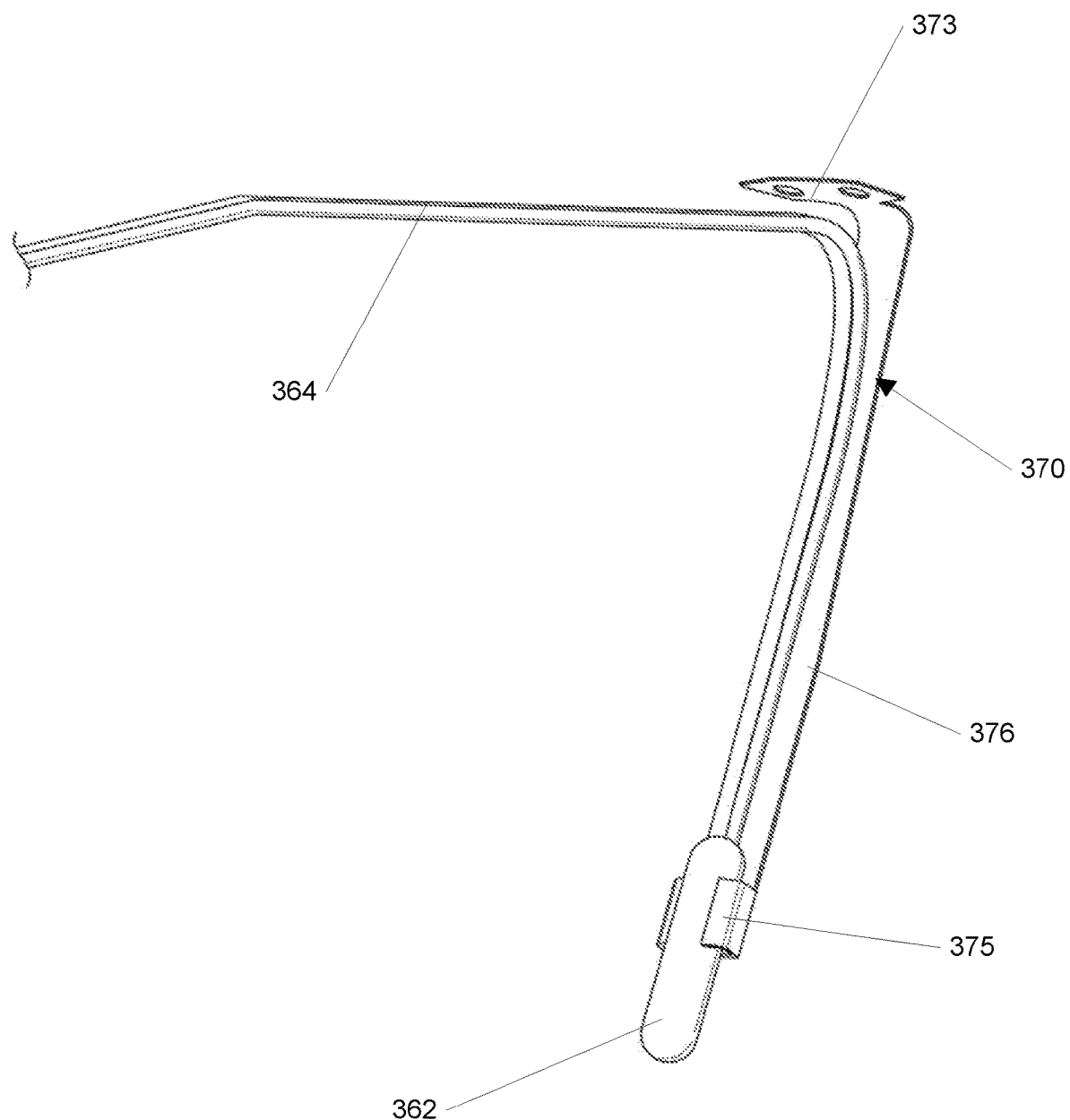
FIG. 19A shows a perspective close-up view of the NTC thermistor temperature sensor and the temperature sensor holder from FIG. 17A in accordance with an embodiment.
Figure 19B:
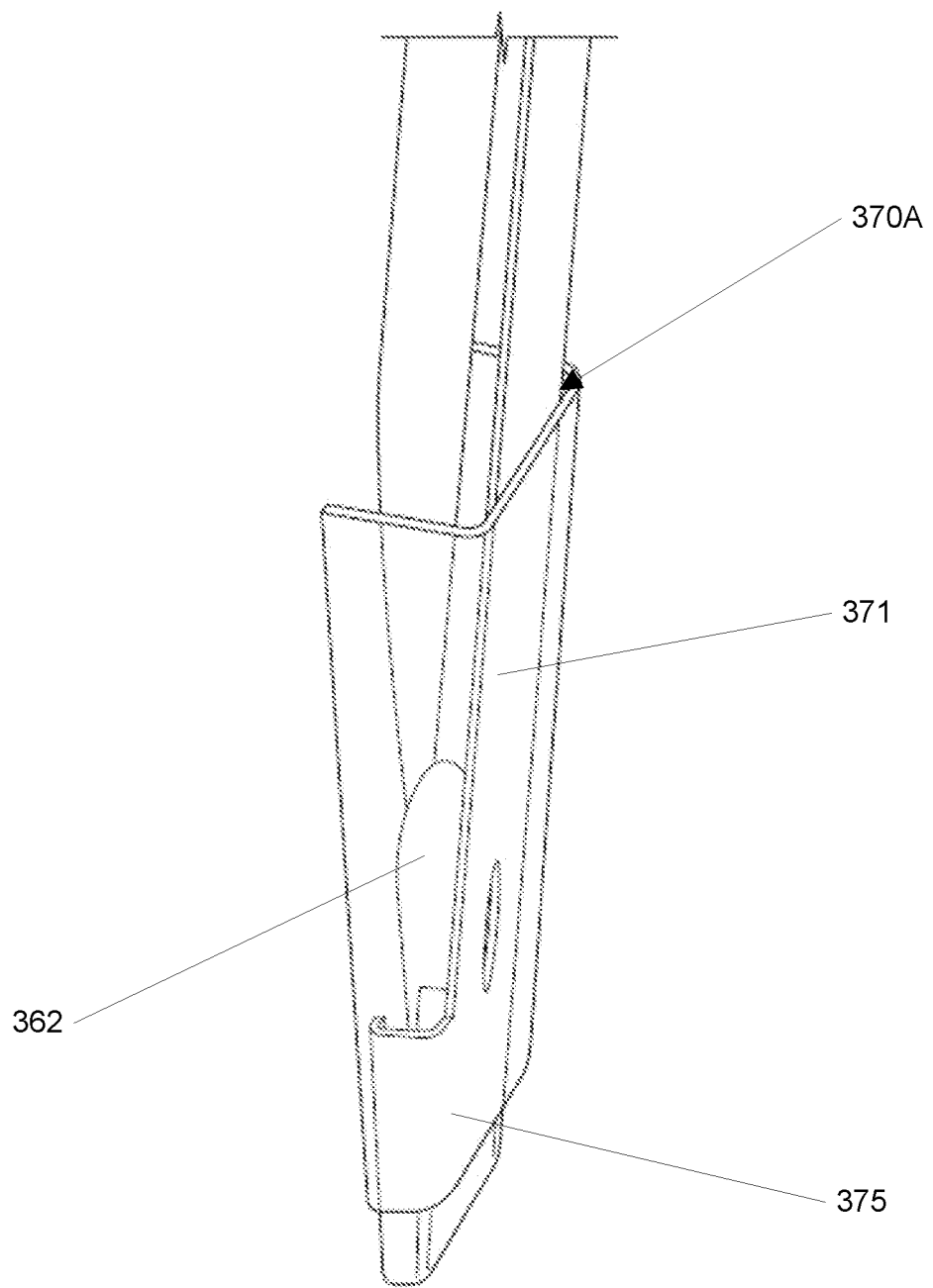
FIG. 19B shows a side close-up view of the NTC thermistor temperature sensor and another temperature sensor holder in accordance with an embodiment.

FIG. 19B shows a close-up view of another temperature sensor holder 370B with the NTC thermistor temperature sensor 362 in accordance with an embodiment. The temperature sensor holder 370B illustrated in FIG. 19B includes a shrinkable tube 371 located at the second end 374 of the temperature sensor holder 370B. With heat emitted from the battery cell 330, the shrinkable tube 371 may seal and shrink to attach the NTC thermistor temperature sensor 362 to the longitudinal side of the battery cell 330. The shrinkable tube 371 may be made of any material that melts and/or shrinks and has sealing properties when heated. The shrinkable tube 371 may help assist with the placement and securing of the NTC thermistor temperature sensor 362 to the longitudinal side of the battery cell 330.

Figure 21:
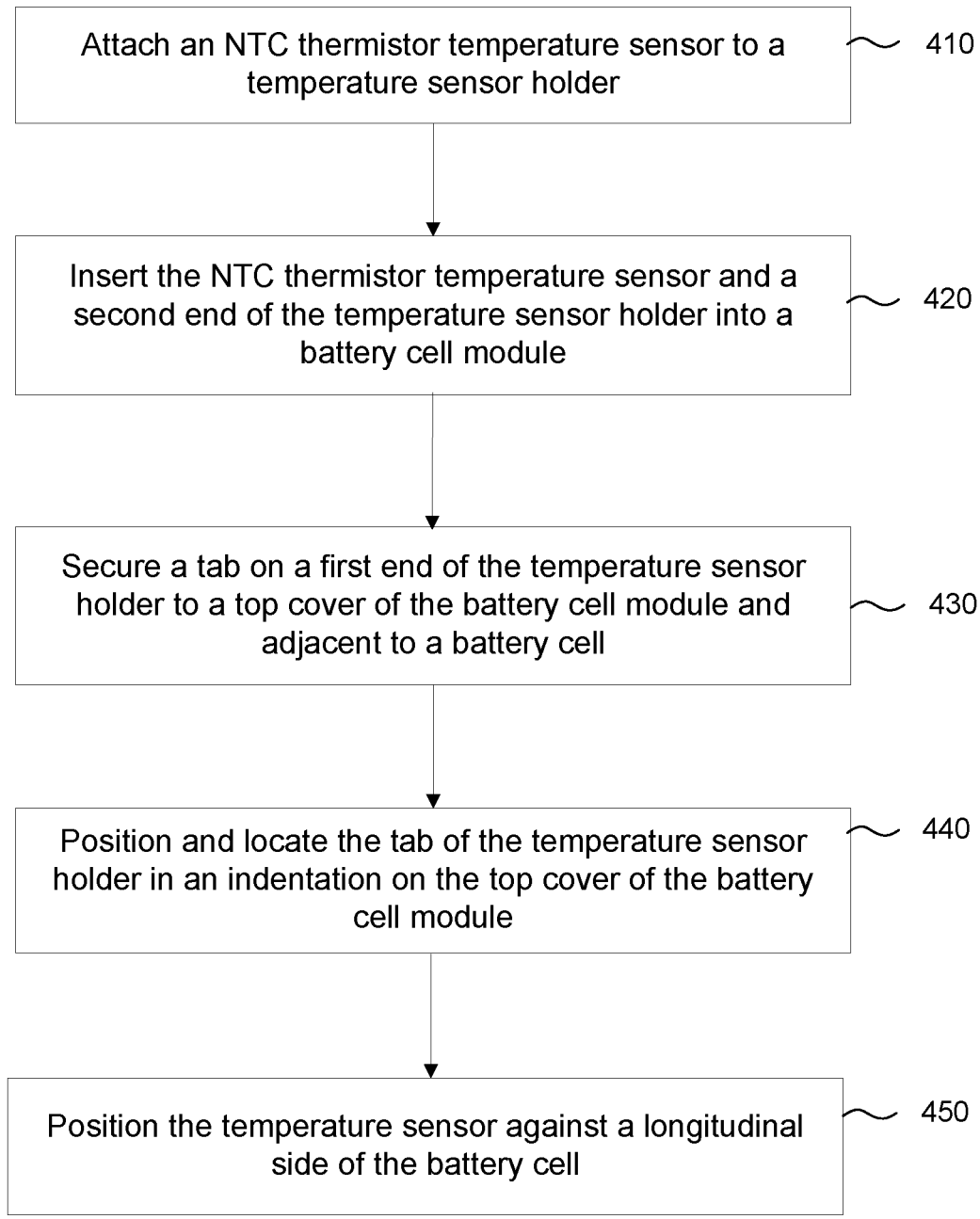
FIG. 21 is a flow chart showing an example method for attaching an NTC thermistor temperature sensor to a large-format battery pack configured for electrically powering an end device.

FIG. 21 is a flow chart showing an illustrative method 400 for attaching an NTC thermistor temperature sensor to a large-format battery pack configured for electrically powering an end device. The steps of the method 400 may further be utilized to measure an external temperature of the battery cell of a plurality of battery cells within the large-format, rechargeable battery. The method of FIG. 21 may be performed for an NTC thermistor temperature sensor using any of battery packs 100, 200, or 300. The steps of the method 400 may comprise, e.g., what is described in connection with the battery packs 100, 200, or 300 in FIGS. 1-20D. Although various operations shown in FIG. 21 are described as performed for the battery packs 100, 200, 300, one, some, or all such operations (or parts thereof) may be performed by one or more additional components and/or systems. The order of steps shown in FIG. 21 may be varied, and/or one or more steps may be omitted, and/or one or more steps may be added.

In step 410, an NTC thermistor temperature sensor may be attached to a temperature sensor holder. The temperature sensor holder may include a first end with a tab and a second end opposite the first end. The second end may comprise a clip portion attaching to the NTC thermistor temperature sensor. The temperature sensor holder may further comprise a rod or bar rod extending between the first end and the second end. The NTC thermistor temperature sensor may be configured to measure an external temperature of a battery cell.

In step 420, the NTC thermistor temperature sensor and the second end of the temperature sensor holder may be inserted into a battery cell module. The battery cell module may include a top cover and a bottom holder. The NTC thermistor temperature sensor and the second end of the temperature sensor holder may be inserted through an access hole in the top cover.

In step 430, a tab on the first end of the end of the temperature sensor holder may be secured to the top cover of the battery cell module and adjacent to a battery cell. The tab may be located on the top cover adjacent a terminal of the battery cell. The battery cell may be fixed within the battery cell module and may be one of a plurality of battery cells arranged in the battery cell holder in a parallel configuration to form a battery block.

In step 440, the tab of the temperature sensor holder may be positioned and located in an indentation on the top cover of the battery cell module. The indentation may be sized and shaped to match a size and shape of the tab of the temperature sensor holder.

In step 450, the rod may position the temperature sensor against a longitudinal side of the battery cell. The bar may include an angular bend. When the tab is secured to the top cover and located in the indentation, the angular bend provides a biasing force that pushes the clip portion and the NTC thermistor temperature sensor against the longitudinal side of the battery cell to measure the external temperature of the battery cell.

Alternatively, according to other embodiments of the invention, the battery pack 300 may include other thermistors and/or temperature sensors in place of or in addition to the NTC thermistor temperature sensor 362 for use with the battery cells 330. In another exemplary embodiment, the battery pack 300 may include a positive temperature coefficient (PTC) thermistor temperature sensor assembly, a PTC thermistor temperature sensor, and a PTC temperature sensor holder. The PTC thermistor temperature assembly may provide variable resistance based on temperature. For an NTC thermistor temperature sensor, as temperature increases, the resistance drops from high to low and allows current to pass through. In contrast, for a PTC thermistor temperature sensor, as temperature rises, resistance increases from low to high and blocks the overcurrent. Specific scenarios may require a PTC thermistor over an NTC thermistor, which may include one or more of the following: equipment with a near-zero reset time, extreme temperature conditions, and systems that experience frequent shorts. In another exemplary embodiment, the battery pack 300 may include other temperature sensors for use with the battery cells 330.

Many illustrative embodiments are listed below in accordance with one or more aspects disclosed herein. Many of the embodiments listed below are described as depending from various embodiments and the dependencies are not limited and may be depending from any of the embodiments as is described and contemplated by this disclosure. Moreover, that any one or more of the listed embodiments may be incorporated into any of embodiments #1, #2, #3, #4, #5, #6, #7, or #8 is contemplated by this disclosure.

Embodiment #1. A battery pack for use with a battery system configured for electrically powering an end device and comprising a plurality of battery packs, the battery pack comprising:
 an outer enclosure that houses a plurality of battery cell holders, the outer enclosure comprising four outer walls extending perpendicularly from a base, wherein the outer enclosure includes a filling material of both a resin and a glass fiber;
 an enclosure cover that fits over the outer enclosure;
 a plurality of battery cells fixed within the plurality of battery cell holders, wherein the plurality of battery cells are arranged in the battery cell holder in a parallel configuration with their end faces arranged in the same plane to form a battery block, wherein each of the plurality of battery cells include an outer tube extending around a body of each of the plurality of battery cells, the outer tube to provide thermal insulation to each of the plurality of battery cells;
 a first plate located adjacent to a bottom of the battery block, wherein the first plate includes mica material to provide thermal insulation to the plurality of battery cells and the battery block; and
 a second plate located adjacent to a top of the battery block opposite the first plate, wherein the second plate includes mica material to provide thermal insulation to the plurality of battery cells and the battery block.

Embodiment #2. A battery pack for use with a battery system configured for electrically powering an end device and comprising a plurality of battery packs, the battery pack comprising:
 an outer enclosure that houses a plurality of battery cell holders, the outer enclosure comprising four outer walls extending perpendicularly from a base, wherein the outer enclosure includes a filling material of both a resin and a glass fiber, wherein the filling material fills a layer within the outer enclosure;
 an enclosure cover that fits over the outer enclosure, wherein the enclosure cover includes an output power connect assembly with a printed circuit board assembly (PCBA) and one or more metal terminal components;
 a plurality of battery cells fixed within the plurality of battery cell holders, wherein the plurality of battery cells form a battery block, wherein each of the plurality of battery cells include an outer tube extending around a body of each of the plurality of battery cells, wherein the outer tube is a mica tube to provide thermal insulation to the plurality of battery cells and the battery block;

a first plate located adjacent to a negative side of the battery block, wherein the first plate includes mica material to provide thermal insulation to the plurality of battery cells and the battery block; and a second plate located adjacent to a positive side of the battery block, wherein the second plate includes mica material to provide thermal insulation to the plurality of battery cells and the battery block.

Embodiment #3. A battery pack for use with a battery system configured for electrically powering an end device and comprising a plurality of battery packs, the battery pack comprising:

an outer enclosure that houses a plurality of battery cell holders, the outer enclosure comprising four outer walls extending perpendicularly from a base, wherein the outer enclosure includes a filling material of both a resin and a glass fiber, wherein the filling material fills a layer within the four outer walls and the base of the outer enclosure, and further wherein the outer walls comprise a plurality of concave and convex ribs, the plurality of concave and convex ribs extending vertically from the base along an external surface of the plurality of outer walls;

an enclosure cover that fits over the outer enclosure;

a plurality of battery cells fixed within the plurality of battery cell holders, wherein the plurality of battery cells are arranged in the battery cell holder in a parallel configuration with their end faces arranged in the same plane to form a battery block, wherein each of the plurality of battery cells include an outer tube extending around a body of each of the plurality of battery cells, wherein the outer tube is a mica tube to provide thermal insulation to each of the plurality of battery cells;

a first plate located adjacent to a bottom of the battery block, wherein the first plate is a first mica plate to provide thermal insulation to the plurality of battery cells and the battery block; and a second plate located adjacent to a top of the battery block opposite the first plate, wherein the second plate is a second mica plate to provide thermal insulation to the plurality of battery cells and the battery block.

Embodiment #4. A battery pack output connection assembly for use with a battery pack that comprises a plurality of battery cells, the battery pack output connection assembly comprising:

a printed circuit board assembly (PCBA) that includes at least one polygon-shaped opening;

at least one metal terminal, wherein each metal terminal fits inside each of the polygon-shaped openings of the PCBA, the metal terminal including a terminal head, a terminal base with a polygon shape and adjacent the PCBA, and a metal rod soldering head opposite the terminal head, wherein the metal rod soldering head is polygon-shaped to match and fit inside the polygon-shaped opening of the PCBA, the metal rod soldering head including one or more grooves along the metal rod soldering head to increase the welding force, torque force, and high impact force, wherein the one or more grooves include two grooves that create a cross along the metal rod soldering head; and an enclosure cover configured to fit over an outer enclosure of the battery pack, the enclosure cover including at least one cover hole, wherein each cover hole slides over and tightly fits around each metal terminal.

Embodiment #5. A battery pack output connection assembly for use with a battery pack that comprises a plurality of battery cells, the battery pack output connection assembly comprising:

a printed circuit board assembly (PCBA) that includes at least one polygon-shaped opening;

at least one metal plate mounted on the PCBA using a surface mount technology (SMT), each metal plate including an arm portion and a hole portion, with the hole portion located over the polygon-shaped opening of the PCBA, wherein the arm portion extends along the PCBA to increase a conductive cross-sectional area along the PCBA to withstand a high current, wherein the hole portion is polygon-shaped that matches the polygon-shaped opening of the PCBA;

at least one metal terminal, wherein each metal terminal fits inside each of the polygon-shaped openings of the PCBA and the hole portions of the metal plate, the metal terminal including a terminal head, a terminal base with a polygon shape and adjacent the metal plate and the PCBA, and a metal rod soldering head opposite the terminal head, wherein the metal rod soldering head is polygon-shaped to match and fit inside the polygon-shaped opening of the PCBA; and an enclosure cover configured to fit over an outer enclosure of the battery pack, the enclosure cover including at least one cover hole, wherein each cover hole slides over and tightly fits around each metal terminal.

Embodiment #6. A battery pack output connection assembly for use with a battery pack that comprises a plurality of battery cells, the battery pack output connection assembly comprising:

a printed circuit board assembly (PCBA) that includes at least one polygon-shaped opening;

at least one metal plate mounted on the PCBA using a surface mount technology (SMT), each metal plate including an arm portion and a hole portion, with the hole portion located over the polygon-shaped opening of the PCBA;

at least one metal terminal, wherein each metal terminal fits inside each of the polygon-shaped openings of the PCBA, the metal terminal including a terminal head, a terminal base with a polygon shape and adjacent the metal plate and the PCBA, and a metal rod soldering head opposite the terminal head, wherein the metal rod soldering head is polygon-shaped to match and fit inside the polygon-shaped opening of the PCBA; and an enclosure cover configured to fit over an outer enclosure of the battery pack, the enclosure cover including at least one cover hole, wherein each cover hole slides over and tightly fits around each metal terminal, wherein each cover hole includes a top portion, middle portion, and a bottom portion, the top portion includes a gradient circular opening to fit over and match the conoid shape of the terminal head of the metal terminal, the middle portion includes a straight-edge circular opening to fit over and match the metal terminal, and the bottom portion includes a polygon-shaped opening to fit over and match the polygon-shape of the terminal base of the metal terminal.

Embodiment #7. A large-format battery pack configured for electrically powering an end device, the large-format battery pack comprising:

an outer enclosure comprising a battery cell holder configured to hold a plurality of battery cell modules, wherein the battery cell holder includes a top cover and a bottom holder;

a plurality of battery cells, each battery cell of the plurality of battery cells fixed within a battery cell module of the plurality of battery cell modules, wherein the plurality of battery cells is arranged in the battery cell holder in a parallel configuration to form a battery block;

at least thermistor temperature sensor positioned to measure an external temperature of a battery cell of the plurality of battery cells, wherein the thermistor temperature sensor is a one of a negative temperature coefficient (NTC) thermistor temperature sensor or a positive temperature coefficient (PTC) thermistor temperature sensor; and a temperature sensor holder comprising a first end, a second end opposite the first end, and a rod extending between the first end and the second end, the first end comprising a tab, the second end comprising a clip portion, and the rod comprising an angular bend configured to provide a biasing force to the second end and in the direction of a longitudinal side of the battery cell, wherein the tab affixes the temperature sensor holder to the top cover adjacent a terminal of the battery cell, wherein the clip portion of the temperature sensor holder attaches to the thermistor temperature sensor, and wherein the rod is positioned adjacent to the longitudinal side of the battery cell.

Embodiment #8. A method for attaching a thermistor temperature sensor to a large-format battery pack configured for electrically powering an end device, the method comprising:

attaching a thermistor temperature sensor to a temperature sensor holder, the temperature sensor holder comprising a first end with a tab and a second end opposite the first end, the second end comprising a clip portion attaching to the thermistor temperature sensor, the temperature sensor holder further comprising a bar rod extending between the first end and the second end, wherein the thermistor temperature sensor is configured to measure an external temperature of a battery cell, wherein the thermistor temperature sensor is a one of a negative temperature coefficient (NTC) thermistor temperature sensor or a positive temperature coefficient (PTC) thermistor temperature sensor;

inserting the second end of the temperature sensor holder into a battery cell module, the battery cell module including a top cover and a bottom holder, wherein the second end of the temperature sensor holder is inserted through an access hole in the top cover;

securing the first end of the temperature sensor holder to the top cover and adjacent to the battery cell, with the tab located on the top cover adjacent a terminal of the battery cell, wherein the battery cell is fixed within the battery cell module, and further wherein the battery cell is one of a plurality of battery cells arranged in the battery cell holder in a parallel configuration to form a battery block; and positioning, by the bar rod, the thermistor temperature sensor against a longitudinal side of the battery cell, wherein the bar rod includes an angular bend, wherein when the tab is secured to the top cover, the angular bend provides a biasing force that pushes the clip portion and the thermistor temperature sensor against the longitudinal side of the battery cell to measure the external temperature of the battery cell.

Embodiment #9. The battery pack, battery pack output connection assembly, and/or large-format battery pack of any of the preceding Embodiments, further comprising an outer enclosure that houses a plurality of battery cell holders.

Embodiment #10. The battery pack, battery pack output connection assembly, and/or large-format battery pack of any of the preceding Embodiments, wherein the outer enclosure comprising four outer walls extending perpendicularly from a base.

Embodiment #11. The battery pack, battery pack output connection assembly, and/or large-format battery pack of any of the preceding Embodiments, wherein the outer enclosure includes a filling material of both a resin and a glass fiber.

Embodiment #12. The battery pack, battery pack output connection assembly, and/or large-format battery pack of any of the preceding Embodiments, wherein the filling material fills a layer within the four outer walls and the base of the outer enclosure.

Embodiment #13. The battery pack, battery pack output connection assembly, and/or large-format battery pack of any of the preceding Embodiments, wherein the outer walls comprise a plurality of concave and convex ribs, the plurality of concave and convex ribs extending vertically from the base along an external surface of the plurality of outer walls.

Embodiment #14. The battery pack, battery pack output connection assembly, and/or large-format battery pack of any of the preceding Embodiments, further comprising an enclosure cover that fits over the outer enclosure.

Embodiment #15. The battery pack, battery pack output connection assembly, and/or large-format battery pack of any of the preceding Embodiments, further comprising a plurality of battery cells fixed within the plurality of battery cell holders.

Embodiment #16. The battery pack, battery pack output connection assembly, and/or large-format battery pack of any of the preceding Embodiments, wherein the plurality of battery cells are arranged in the battery cell holder in a parallel configuration with their end faces arranged in the same plane to form a battery block.

Embodiment #17. The battery pack, battery pack output connection assembly, and/or large-format battery pack of any of the preceding Embodiments, wherein each of the plurality of battery cells include an outer tube extending around a body of each of the plurality of battery cells.

Embodiment #18. The battery pack, battery pack output connection assembly, and/or large-format battery pack of any of the preceding Embodiments, wherein the outer tube is a mica tube to provide thermal insulation to each of the plurality of battery cells.

Embodiment #19. The battery pack, battery pack output connection assembly, and/or large-format battery pack of any of the preceding Embodiments, further comprising a first plate located adjacent to a bottom of the battery block.

Embodiment #20. The battery pack, battery pack output connection assembly, and/or large-format battery pack of any of the preceding Embodiments, wherein the first plate is a first mica plate to provide thermal insulation to the plurality of battery cells and the battery block.

Embodiment #21. The battery pack, battery pack output connection assembly, and/or large-format battery pack of any of the preceding Embodiments, further comprising a second plate located adjacent to a top of the battery block opposite the first plate.

Embodiment #22. The battery pack, battery pack output connection assembly, and/or large-format battery pack of any of the preceding Embodiments, wherein the second plate is a second mica plate to provide thermal insulation to the plurality of battery cells and the battery block.

Embodiment #23. The battery pack, battery pack output connection assembly, and/or large-format battery pack of any of the preceding Embodiments, wherein the battery cell holders include a top cover and a bottom holder.

Embodiment #24. The battery pack, battery pack output connection assembly, and/or large-format battery pack of any of the preceding Embodiments, wherein the outer enclosure is plastic.

Embodiment #25. The battery pack, battery pack output connection assembly, and/or large-format battery pack of any of the preceding Embodiments, wherein the outer walls comprise a plurality of concave ribs extending vertically from the base along an external surface of the plurality of outer walls.

Embodiment #26. The battery pack, battery pack output connection assembly, and/or large-format battery pack of any of the preceding Embodiments, wherein the outer walls comprise a plurality of convex ribs extending vertically from the base along an external surface of the plurality of outer walls.

Embodiment #27. The battery pack, battery pack output connection assembly, and/or large-format battery pack of any of the preceding Embodiments, wherein the outer enclosure passes a fire resistance test of ECE R100.

Embodiment #28. The battery pack, battery pack output connection assembly, and/or large-format battery pack of any of the preceding Embodiments, wherein the enclosure cover includes an output power connect assembly with a printed circuit board assembly (PCBA) and one or more metal terminal components.

Embodiment #29. The battery pack, battery pack output connection assembly, and/or large-format battery pack of any of the preceding Embodiments, wherein the battery cell is a lithium ion battery.

Embodiment #30. The battery pack, battery pack output connection assembly, and/or large-format battery pack of any of the preceding Embodiments, further including a printed circuit board assembly (PCBA) that includes at least one polygon-shaped opening.

Embodiment #31. The battery pack, battery pack output connection assembly, and/or large-format battery pack of any of the preceding Embodiments, further including at least one metal plate mounted on the PCBA using a surface mount technology (SMT).

Embodiment #32. The battery pack, battery pack output connection assembly, and/or large-format battery pack of any of the preceding Embodiments, wherein each metal plate includes an arm portion and a hole portion, with the hole portion located over the polygon-shaped opening of the PCBA.

Embodiment #33. The battery pack, battery pack output connection assembly, and/or large-format battery pack of any of the preceding Embodiments, further including at least one metal terminal.

Embodiment #34. The battery pack, battery pack output connection assembly, and/or large-format battery pack of any of the preceding Embodiments, wherein each metal terminal fits inside each of the polygon-shaped openings of the PCBA.

Embodiment #35. The battery pack, battery pack output connection assembly, and/or large-format battery pack of any of the preceding Embodiments, wherein the metal terminal includes a terminal head, a terminal base with a polygon shape and adjacent the metal plate and the PCBA, and a metal rod soldering head opposite the terminal head.

Embodiment #36. The battery pack, battery pack output connection assembly, and/or large-format battery pack of any of the preceding Embodiments, wherein the metal rod soldering head is polygon-shaped to match and fit inside the polygon-shaped opening of the PCBA.

Embodiment #37. The battery pack, battery pack output connection assembly, and/or large-format battery pack of any of the preceding Embodiments, further including an enclosure cover configured to fit over an outer enclosure of the battery pack Embodiment #38. The battery pack, battery pack output connection assembly, and/or large-format battery pack of any of the preceding Embodiments, wherein the enclosure cover includes at least one cover hole.

Embodiment #39. The battery pack, battery pack output connection assembly, and/or large-format battery pack of any of the preceding Embodiments, wherein each cover hole slides over and tightly fits around each metal terminal.

Embodiment #40. The battery pack, battery pack output connection assembly, and/or large-format battery pack of any of the preceding Embodiments, wherein each cover hole includes a top portion, middle portion, and a bottom portion.

Embodiment #41. The battery pack, battery pack output connection assembly, and/or large-format battery pack of any of the preceding Embodiments, wherein the top portion includes a gradient circular opening to fit over and match the conoid shape of the terminal head of the metal terminal.

Embodiment #42. The battery pack, battery pack output connection assembly, and/or large-format battery pack of any of the preceding Embodiments, wherein the middle portion includes a straight-edge circular opening to fit over and match the metal terminal.

Embodiment #43. The battery pack, battery pack output connection assembly, and/or large-format battery pack of any of the preceding Embodiments, wherein the bottom portion includes a polygon-shaped opening to fit over and match the polygon-shape of the terminal base of the metal terminal.

Embodiment #44. The battery pack, battery pack output connection assembly, and/or large-format battery pack of any of the preceding Embodiments, wherein the arm portion extends along the PCBA to increase a conductive cross-sectional area along the PCBA to withstand a high current.

Embodiment #45. The battery pack, battery pack output connection assembly, and/or large-format battery pack of any of the preceding Embodiments, wherein the hole portion of the metal plate is polygon-shaped that matches the polygon-shaped opening of the PCBA.

Embodiment #46. The battery pack, battery pack output connection assembly, and/or large-format battery pack of any of the preceding Embodiments, wherein the polygon-shaped hole portion of the metal plate is a hexagon shape.

Embodiment #47. The battery pack, battery pack output connection assembly, and/or large-format battery pack of any of the preceding Embodiments, wherein the terminal head is conoid shaped to guide the metal terminal through the cover opening enclosure cover.

Embodiment #48. The battery pack, battery pack output connection assembly, and/or large-format battery pack of any of the preceding Embodiments, wherein the polygon-shaped opening of the PCBA is a hexagon shape.

Embodiment #49. The battery pack, battery pack output connection assembly, and/or large-format battery pack of any of the preceding Embodiments, wherein the polygon shape of the terminal base is a hexagon shape.

Embodiment #50. The battery pack, battery pack output connection assembly, and/or large-format battery pack of any of the preceding Embodiments, wherein the metal terminal includes one or more O-rings located on one or more circular grooves on each of the metal terminals, wherein the one or more O-rings provide a water ingress protection and a compliance with IPX7.

Embodiment #51. The battery pack, battery pack output connection assembly, and/or large-format battery pack of any of the preceding Embodiments, wherein the metal terminal includes a lubricating oil around the one or more O-rings.

Embodiment #52. The battery pack, battery pack output connection assembly, and/or large-format battery pack of any of the preceding Embodiments, wherein the one or more O-rings are located between the metal terminal and the enclosure cover, and match with the enclosure cover for water ingress protection and compliance with IPX7.

Embodiment #53. The battery pack, battery pack output connection assembly, and/or large-format battery pack of any of the preceding Embodiments, wherein the metal terminal includes red copper.

Embodiment #54. The battery pack, battery pack output connection assembly, and/or large-format battery pack of any of the preceding Embodiments, wherein the at least one metal terminals includes two metal terminals.

Embodiment #55. The battery pack, battery pack output connection assembly, and/or large-format battery pack of any of the preceding Embodiments, wherein the polygon-shaped opening of the cover opening is a hexagon shape.

Embodiment #56. The battery pack, battery pack output connection assembly, and/or large-format battery pack of any of the preceding Embodiments, wherein the angular bend of the rod is approximately 5 degrees.

Embodiment #57. The battery pack, battery pack output connection assembly, and/or large-format battery pack of any of the preceding Embodiments, wherein the angular bend of the rod is located approximately 20 millimeters from the first end.

Embodiment #58. The battery pack, battery pack output connection assembly, and/or large-format battery pack of any of the preceding Embodiments, wherein the angular bend of the rod provides a biasing force to ensure the thermistor temperature sensor remains in contact with the longitudinal side of the battery cell.

Embodiment #59. The battery pack, battery pack output connection assembly, and/or large-format battery pack of any of the preceding Embodiments, wherein the top cover of the battery cell module includes an indentation that is sized and shaped to match a size and shape of the tab of the temperature sensor holder.

Embodiment #60. The battery pack, battery pack output connection assembly, and/or large-format battery pack of any of the preceding Embodiments, wherein the rod includes a length of approximately 30-35 millimeters, wherein the length of the rod positions the thermistor temperature sensor against the longitudinal side of the battery cell for measurement of the external temperature of the battery cell.

Embodiment #61. The battery pack, battery pack output connection assembly, and/or large-format battery pack of any of the preceding Embodiments, wherein the temperature sensor holder further comprises a shrinkable tube located at the second end of the temperature sensor holder, wherein, with heat from the battery cell, the shrinkable tube seals and shrinkably attaches the thermistor temperature sensor to the longitudinal side of the battery cell.

Embodiment #62. The battery pack, battery pack output connection assembly, and/or large-format battery pack of any of the preceding Embodiments, wherein the rod extends through an access hole in the top cover to be positioned adjacent to the longitudinal side of the battery cell.

Embodiment #63. A temperature sensor holder configured to hold a thermistor temperature sensor for one or more battery cells for a large-format battery pack configured for electrically powering an end device, the temperature sensor holder comprising:
 a first end comprising a tab;
 a second end opposite the first end, the second end comprising a clip portion; and
 a rod extending between the first end and the second end, comprising an angular bend configured to provide a biasing force to the second end and in a direction of a longitudinal side of the one or more battery cells, wherein the tab affixes the temperature sensor holder to the battery cell, wherein the clip portion of the temperature sensor holder attaches to the thermistor temperature sensor, and wherein the rod is positioned adjacent to the longitudinal side of the battery cell,
 wherein the large-format battery pack includes an outer enclosure comprising a battery cell holder configured to hold a plurality of battery cell modules, the one or more battery cells with each battery cell of the one or more of battery cells fixed within a battery cell module of the plurality of battery cell modules, and the thermistor temperature sensor positioned to measure an external temperature of the battery cell of the plurality of battery cells.

With some embodiments, the term "large-format" encompasses medium-format battery embodiments and use cases, and vice-versa. For example, medium-scale and large-scale applications are embodied by the numerous descriptions herein.

Although many of the battery packs described herein reference Lithium ion battery storage chemistry, the disclosure is not so limited. In many instances, a person of ordinary skill in the art will appreciate that other major chemistries for rechargeable batteries may be appropriated substituted without substantially departing from the spirit of the solution: Lithium-ion (Li-ion), Nickel Cadmium (Ni—Cd), Nickel-Metal Hydride (Ni-MH), Lead-Acid, and other chemistries. With some embodiments, the solutions disclosed herein may be included with these technology batteries to provide battery protection, provide improved efficiency, and provide a better user experience than previous battery technologies. Variants of the lithium cobalt cathode, such as nickel cobalt aluminum (NCA) and nickel manganese cobalt (NMC), may be desirable in electric vehicles and other applications. Other new cathode chemistries, such as lithium manganese spinel (LMO) and lithium iron phosphate (LFP), may be used where appropriate. Moreover, large-format battery packs offer lower system integration costs because, inter alia, it enables a reduced number of battery interconnections, further improving the reliability of the battery pack and providing for a much higher value proposition.

We claim:

1. A battery pack output connection assembly for use with a battery pack that comprises a plurality of battery cells, the battery pack output connection assembly comprising:
 a printed circuit board assembly (PCBA) that includes one or more polygon-shaped openings;
 one or more metal terminals, wherein each of the one or more metal terminals fits inside each of the one or more polygon-shaped openings of the PCBA, each of the one or more metal terminals including a terminal head, a terminal base with a polygon shape and adjacent the PCBA, and a metal rod soldering head opposite the terminal head, wherein the metal rod soldering head is polygon-shaped to match and fit inside the one or more polygon-shaped openings of the PCBA, the metal rod soldering head including a plurality of grooves along the metal rod soldering head to increase a welding force and a torque force, wherein the plurality of grooves include two grooves that create a cross along the metal rod soldering head; and an enclosure cover configured to fit over an outer enclosure of the battery pack, the enclosure cover including one or more cover holes, wherein each of the one or more cover holes slides over and tightly fits around each of the one or more metal terminals.

2. The battery pack output connection assembly of claim 1 further comprising:

one or more metal plates mounted on the PCBA using a surface mount technology (SMT), each of the one or more metal plates including an arm portion and a hole portion, with the hole portion located over the one or more polygon-shaped openings of the PCBA.

3. The battery pack output connection assembly of claim 2, wherein the hole portion of each of the one or more metal plates is polygon-shaped that matches the one or more polygon-shaped openings of the PCBA.

4. The battery pack output connection assembly of claim 1, wherein each of the one or more metal terminals includes one or more O-rings located on one or more circular grooves on each of the one or more metal terminals, wherein the one or more O-rings provide a water ingress protection.

5. The battery pack output connection assembly of claim 1, wherein each of the one or more cover holes includes a top portion, a middle portion, and a bottom portion, the top portion includes a gradient circular opening to fit over and match the terminal head of each of the one or more metal terminals, the middle portion includes a straight-edge circular opening to fit over and match each of the one or more metal terminals, and the bottom portion includes a polygon-shaped opening to fit over and match the polygon-shape of the terminal base of each of the one or more metal terminals.

6. The battery pack output connection assembly of claim 1, wherein each of the one or more polygon-shaped openings of the PCBA is a hexagon shape.

7. The battery pack output connection assembly of claim 1, wherein the terminal base is a hexagon shape.

8. The battery pack output connection assembly of claim 1, wherein the terminal head is conoid shaped to guide each of the one or more metal terminals through each of the one or more cover holes on the enclosure cover.

9. A battery pack output connection assembly for use with a battery pack that comprises a plurality of battery cells, the battery pack output connection assembly comprising:

a printed circuit board assembly (PCBA) that includes one or more polygon-shaped openings;

one or more metal plates mounted on the PCBA using a surface mount technology (SMT), each of the one or more metal plates including an arm portion and a hole portion, with the hole portion located over each of the one or more polygon-shaped openings of the PCBA;

one or more metal terminals, wherein each of the one or more metal terminals fits inside each of the one or more polygon-shaped openings of the PCBA, each of the one or more metal terminals including a terminal head, a terminal base with a polygon shape and adjacent the metal plate and the PCBA, and a metal rod soldering head opposite the terminal head, wherein the metal rod soldering head is polygon-shaped to match and fit inside the one or more polygon-shaped openings of the PCBA; and an enclosure cover configured to fit over an outer enclosure of the battery pack, the enclosure cover including one or more cover holes, wherein each of the one or more cover holes slides over and tightly fits around each of the one or more metal terminals, wherein each of the one or more cover holes includes a top portion, a middle portion, and a bottom portion, the top portion includes a gradient circular opening to fit over and match the terminal head of each of the one or more metal terminals, the middle portion includes a straight-edge circular opening to fit over and match each of the one or more metal terminals, and the bottom portion includes a polygon-shaped opening to fit over and match the polygon-shape of the terminal base of each of the one or more metal terminals.

10. The battery pack output connection assembly of claim 9, wherein the hole portion is polygon-shaped that matches the one or more polygon-shaped openings of the PCBA.

11. The battery pack output connection assembly of claim 9, wherein the terminal head is conoid shaped to guide the each of the one or more metal terminals through each of the one or more cover holes on the enclosure cover.

12. The battery pack output connection assembly of claim 9, wherein the metal rod soldering head includes one or more grooves along the metal rod soldering head to increase a welding force and a torque force.

13. The battery pack output connection assembly of claim 9, wherein each of the one or more metal terminals includes one or more O-rings located on one or more circular grooves on each of the one or more metal terminals, wherein the one or more O-rings provide a water ingress protection.

14. The battery pack output connection assembly of claim 9, wherein the one or more polygon-shaped openings of the PCBA is a hexagon shape.

15. The battery pack output connection assembly of claim 9, wherein the terminal base is a hexagon shape.

16. A battery pack output connection assembly for use with a battery pack that comprises a plurality of battery cells, the battery pack output connection assembly comprising:

a printed circuit board assembly (PCBA) that includes one or more polygon-shaped openings;

one or more metal terminals, wherein each of the one or more metal terminals fits inside each of the one or more polygon-shaped openings of the PCBA, each of the one or more metal terminals including a terminal head, a circular portion, a terminal base with a polygon shape adjacent the circular portion and adjacent the PCBA, and a metal rod soldering head opposite the terminal head, wherein the metal rod soldering head is polygon-shaped to match and fit inside each of the one or more polygon-shaped openings of the PCBA, the metal rod soldering head including a plurality of grooves along the metal rod soldering head to increase a welding force and a torque force, wherein the plurality of grooves include two grooves that create a cross along the metal rod soldering head, wherein each of the one or more metal terminals includes one or more O-rings located on one or more circular grooves on the circular portion of each of the one or more metal terminals, wherein the one or more O-rings are located between each of the one or more metal terminals and an enclosure cover, and match with the enclosure cover to provide water ingress protection; and one or more metal plates mounted on the PCBA, each of the one or more metal plates including an arm portion and a hole portion, with the hole portion located over each of the one or more polygon-shaped openings of the PCBA, wherein the hole portion of the one or more metal plates is polygon-shaped that matches each of the one or more polygon-shaped openings of the PCBA, wherein the enclosure cover is configured to fit over an outer enclosure of the battery pack, the enclosure cover including one or more cover holes, wherein each of the one or more cover holes slides over and tightly fits around each metal terminal, wherein each of the one or more cover holes includes a top portion, a middle portion, and a bottom portion, the top portion includes a gradient circular opening to fit over and match the terminal head of each of the one or more metal terminals, the middle portion includes a straight-edge circular opening to fit over and match each of the one or more metal terminals, and the bottom portion includes a polygon-shaped opening to fit over and match the polygon-shape of the terminal base of each of the one or more metal terminals.

17. The battery pack output connection assembly of claim 16, wherein each of the one or more metal plates is mounted on the PCBA using a surface mount technology (SMT).

18. The battery pack output connection assembly of claim 16, wherein the terminal head is conoid shaped to guide each of the one or more metal terminals through each of the one or more cover holes of the enclosure cover.

19. The battery pack output connection assembly of claim 16, wherein the one or more polygon-shaped openings of the PCBA is a hexagon shape.

20. The battery pack output connection assembly of claim 16, wherein the terminal base is a hexagon shape.

* * * * *